US012687709B2

(12) United States Patent
Kuribayashi

(10) Patent No.: US 12,687,709 B2
(45) Date of Patent: Jul. 21, 2026

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Tomonori Kuribayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 447 days.

(21) Appl. No.: 18/030,272

(22) PCT Filed: Oct. 4, 2021

(86) PCT No.: PCT/JP2021/036577
§ 371 (c)(1),
(2) Date: Apr. 5, 2023

(87) PCT Pub. No.: WO2022/097401
PCT Pub. Date: May 12, 2022

(65) Prior Publication Data
US 2023/0375802 A1 Nov. 23, 2023

(30) Foreign Application Priority Data
Nov. 6, 2020 (JP) ................................. 2020-185907

(51) Int. Cl.
*G02B 15/14* (2006.01)
(52) U.S. Cl.
CPC ............................ *G02B 15/144105* (2019.08)
(58) Field of Classification Search
CPC ............................................. G02B 15/144105
See application file for complete search history.

(56) References Cited

U.S. PATENT DOCUMENTS

| | | | |
|---|---|---|---|
| 6,359,739 | B1 | 3/2002 | Sensui |
| 2018/0246292 | A1 | 8/2018 | Tomioka et al. |
| 2020/0110242 | A1 | 4/2020 | Nakahara et al. |

FOREIGN PATENT DOCUMENTS

| | | |
|---|---|---|
| CN | 111025611 A | 4/2020 |
| JP | H04-110811 A | 4/1992 |
| JP | 2001-21798 A | 1/2001 |
| | (Continued) | |

OTHER PUBLICATIONS

Office Action issued Feb. 25, 2025, in Japanese Patent Application No. 2024-036624.

(Continued)

*Primary Examiner* — Wen Huang
(74) *Attorney, Agent, or Firm* — Potomac Law Group, PLLC

(57) ABSTRACT

An optical system (OL) comprising, sequentially along an optical axis from the objective side, a first lens group (G1) having a positive refractive power, a second lens group (G2) having a negative refractive power, a third lens group (G3) having a positive refractive power, and a fourth lens group (G4) having a negative refractive power, wherein, when focusing the optical system, the following conditional expression is satisfied as a result of moving the second lens group (G2) and the third lens group (G3) along the optical axis and changing the interval between adjacent lens groups. 0.20<DG4/TL<0.40 wherein DG4 represents the length of the fourth lens group (G4) on the optical axis, and TL represents the full length of the optical system (OL) when the optical system (OL) comes into focus at an infinite distance.

18 Claims, 13 Drawing Sheets

OL(1)

(FOCUSING)      (FOCUSING)

∞          ∞

S

L11 L12 L13 L14   L21 L22 L23    L31 L32 L33   L41 L42 L43 L44 L45 L46
　　G1(+)　　　　G2(-)　　　　　G3(+)　　　　　　G4(-)

(56)     References Cited

FOREIGN PATENT DOCUMENTS

| JP | 2011-013358 A | 1/2011 |
| JP | 2014-006487 A | 1/2014 |
| JP | 2014-026023 A | 2/2014 |
| JP | 2018-141888 A | 9/2018 |
| JP | 2020-060660 A | 4/2020 |
| JP | 2020-173366 A | 10/2020 |

OTHER PUBLICATIONS

Office Action issued Sep. 5, 2023, in Japanese Patent Application No. 2022-560679.
International Preliminary Report on Patentability from International Patent Application No. PCT/JP2021/036577, May 19, 2023.
Office Action issued Jun. 12, 2025, in Chinese Patent Application No. 202180065897.4.
International Search Report from International Patent Application No. PCT/JP2021/036577, Dec. 21, 2021.

SPHERICAL ABERRATION    ASTIGMATISM    DISTORTION

COMA ABERRATION

CHROMATIC ABERRATION OF MAGNIFICATION

SPHERICAL ABERRATION    ASTIGMATISM    DISTORTION

COMA ABERRATION

CHROMATIC ABERRATION OF MAGNIFICATION

SPHERICAL ABERRATION    ASTIGMATISM    DISTORTION    COMA ABERRATION

CHROMATIC ABERRATION OF MAGNIFICATION

SPHERICAL ABERRATION    ASTIGMATISM    DISTORTION    COMA ABERRATION

CHROMATIC ABERRATION OF MAGNIFICATION

*FIG.5*

SPHERICAL ABERRATION     ASTIGMATISM     DISTORTION

COMA ABERRATION

CHROMATIC ABERRATION OF MAGNIFICATION

SPHERICAL ABERRATION     ASTIGMATISM     DISTORTION

COMA ABERRATION

CHROMATIC ABERRATION OF MAGNIFICATION

*FIG.7*

FNO=2.86        Y=21.70        Y=21.70

SPHERICAL
ABERRATION        ASTIGMATISM        DISTORTION

CHROMATIC ABERRATION
OF MAGNIFICATION

COMA ABERRATION

NA=0.10        Y=21.70        Y=21.70

SPHERICAL
ABERRATION        ASTIGMATISM        DISTORTION

CHROMATIC ABERRATION
OF MAGNIFICATION

COMA ABERRATION

SPHERICAL ABERRATION     ASTIGMATISM     DISTORTION

CHROMATIC ABERRATION OF MAGNIFICATION

COMA ABERRATION

SPHERICAL ABERRATION     ASTIGMATISM     DISTORTION

CHROMATIC ABERRATION OF MAGNIFICATION

COMA ABERRATION

1

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

Conventionally, an optical system that performs focusing by moving a plurality of lens groups on the optical axis has been proposed (for example, see Patent literature 1). In such an optical system, it is difficult to suppress aberration fluctuation during focusing.

PRIOR ARTS LIST

Patent Document

Patent literature 1: Japanese Laid-Open Patent Publication No. 2018-141888(A)

SUMMARY OF THE INVENTION

An optical system according to the first present invention comprises, in order from an object on an optical axis, a first lens group having a positive refractive power, a second lens group having a negative refractive power, a third lens group having a positive refractive power, and a fourth lens group having a negative refractive power, wherein, during focusing, the second lens group and the third lens group move on the optical axis, and distances between the lens groups adjacent to each other change, and the following conditional expression is satisfied, $$0.20 < DG4/TL < 0.40,$$

where DG4: a length of the fourth lens group on the optical axis, and

TL: an entire length of the optical system upon focusing on infinity.

An optical system according to the second present invention comprises, in order from an object on an optical axis, a first lens group having a positive refractive power, a second lens group having a negative refractive power, a third lens group having a positive refractive power, and a fourth lens group having a negative refractive power, wherein, during focusing, the second lens group and the third lens group move on the optical axis and distances between the lens groups adjacent to each other change, and the following conditional expression is satisfied, $$3.00 < (LnR2+LnR1)/(LnR2-LnR1) < 5.00,$$

where LnR1: a radius of curvature of an object-side lens surface of a negative lens disposed closest to an image in the optical system, and LnR2: a radius of curvature of an image-side lens surface of the negative lens disposed closest to the image in the optical system.

An optical system according to the third present invention comprises, in order from an object on an optical axis, a first lens group having a positive refractive power, a second lens group having a negative refractive power, a third lens group having a positive refractive power, and a fourth lens group having a negative refractive power, wherein, during focusing, the second lens group and the third lens group move on the optical axis and distances between the lens groups adjacent to each other change, and the following conditional expression is satisfied, $$0.75 < f1/(-f2) < 1.30,$$

where f1: a focal length of the first lens group, and f2: a focal length of the second lens group.

An optical system according to the fourth present invention comprises, in order from an object on an optical axis, a first lens group having a positive refractive power, a second lens group having a negative refractive power, a third lens group having a positive refractive power, and a fourth lens group having a negative refractive power, wherein, during focusing, the second lens group and the third lens group move on the optical axis and distances between the lens groups adjacent to each other change, and the first lens group includes a negative lens in which the following conditional expressions are satisfied, $$1.80 < ndM1,$$

$$vdM1 < 26.00,$$

$$\theta gFM1 - (0.6415 - 0.00162 \times vdM1) < 0.0120,$$

where ndM1: a refractive index of the negative lens of the first lens group for d-line, vdM1: an Abbe number of the negative lens of the first lens group, and θgFM1: a partial dispersion ratio of the negative lens of the first lens group, which is defined by the following expression, $$\theta gFM1 = (ngM1 - nFM1)/(nFM1 - nCM1),$$

where ngM1 is a refractive index of the negative lens of the first lens group for g-line, nFM1 is a refractive index of the negative lens of the first lens group for F-line, and nCM1 is a refractive index of the negative lens of the first lens group for C-line.

An optical apparatus according to the present invention comprises the optical system described above.

A method according to the first present invention for manufacturing an optical system comprising: in order from an object on an optical axis, a first lens group having a positive refractive power; a second lens group having a negative refractive power; a third lens group having a positive refractive power; and a fourth lens group having a negative refractive power. The method comprises a step of disposing the first to the fourth lens groups in a lens barrel so that during focusing, the second lens group and the third lens group move on the optical axis and distances between the lens groups adjacent to each other change, and the following conditional expression is satisfied.

$$0.20 < DG4/TL < 0.40,$$

where DG4: a length of the fourth lens group on the optical axis, and

TL: an entire length of the optical system upon focusing on infinity.

A method according to the second present invention for manufacturing an optical system comprising: in order from an object on an optical axis, a first lens group having a positive refractive power; a second lens group having a negative refractive power; a third lens group having a positive refractive power; and a fourth lens group having a negative refractive power. The method comprises a step of disposing the first to the fourth lens groups in a lens barrel so that during focusing, the second lens group and the third lens group move on the optical axis and distances between the lens groups adjacent to each other change, and the following conditional expression is satisfied.

$$3.00<(LnR2+LnR1)/(LnR2-LnR1)<5.00,$$

where LnR1: a radius of curvature of an object-side lens surface of a negative lens disposed closest to an image in the optical system, and LnR2: a radius of curvature of an image-side lens surface of the negative lens disposed closest to the image in the optical system.

A method according to the third present invention for manufacturing an optical system comprising: in order from an object on an optical axis, a first lens group having a positive refractive power; a second lens group having a negative refractive power; a third lens group having a positive refractive power; and a fourth lens group having a negative refractive power. The method comprises a step of disposing the first to the fourth lens groups in a lens barrel so that during focusing, the second lens group and the third lens group move on the optical axis and distances between the lens groups adjacent to each other change, and the following conditional expression is satisfied.

$$0.75<f1/(-f2)<1.30,$$

where f1: a focal length of the first lens group, and f2: a focal length of the second lens group.

A method according to the fourth present invention for manufacturing an optical system comprising: in order from an object on an optical axis, a first lens group having a positive refractive power; a second lens group having a negative refractive power; a third lens group having a positive refractive power; and a fourth lens group having a negative refractive power. The method comprises a step of disposing the first to the fourth lens groups in a lens barrel so that during focusing, the second lens group and the third lens group move on the optical axis and distances between the lens groups adjacent to each other change, and the first lens group includes a negative lens in which the following conditional expressions are satisfied.

$$1.80<ndM1,$$

$$vdM1<26.00,$$

$$\theta gFM1-(0.6415-0.00162 \times vdM1)<0.0120,$$

where ndM1: a refractive index of the negative lens of the first lens group for d-line, vdM1: an Abbe number of the negative lens of the first lens group, and θgFM1: a partial dispersion ratio of the negative lens of the first lens group, which is defined by the following expression, $$\theta gFM1=(ngM1-nFM1)/(nFM1-nCM1),$$

where ngM1 is a refractive index of the negative lens of the first lens group for g-line, nFM1 is a refractive index of the negative lens of the first lens group for F-line, and nCM1 is a refractive index of the negative lens of the first lens group for C-line.

BRIEF DESCRIPTION OF THE DRAWINGS

FIG. 5 shows a lens configuration of an optical system according to Third Example;

FIG. 7 shows a lens configuration of an optical system according to Fourth Example;

DESCRIPTION OF THE EMBODIMENTS

Figure 11:
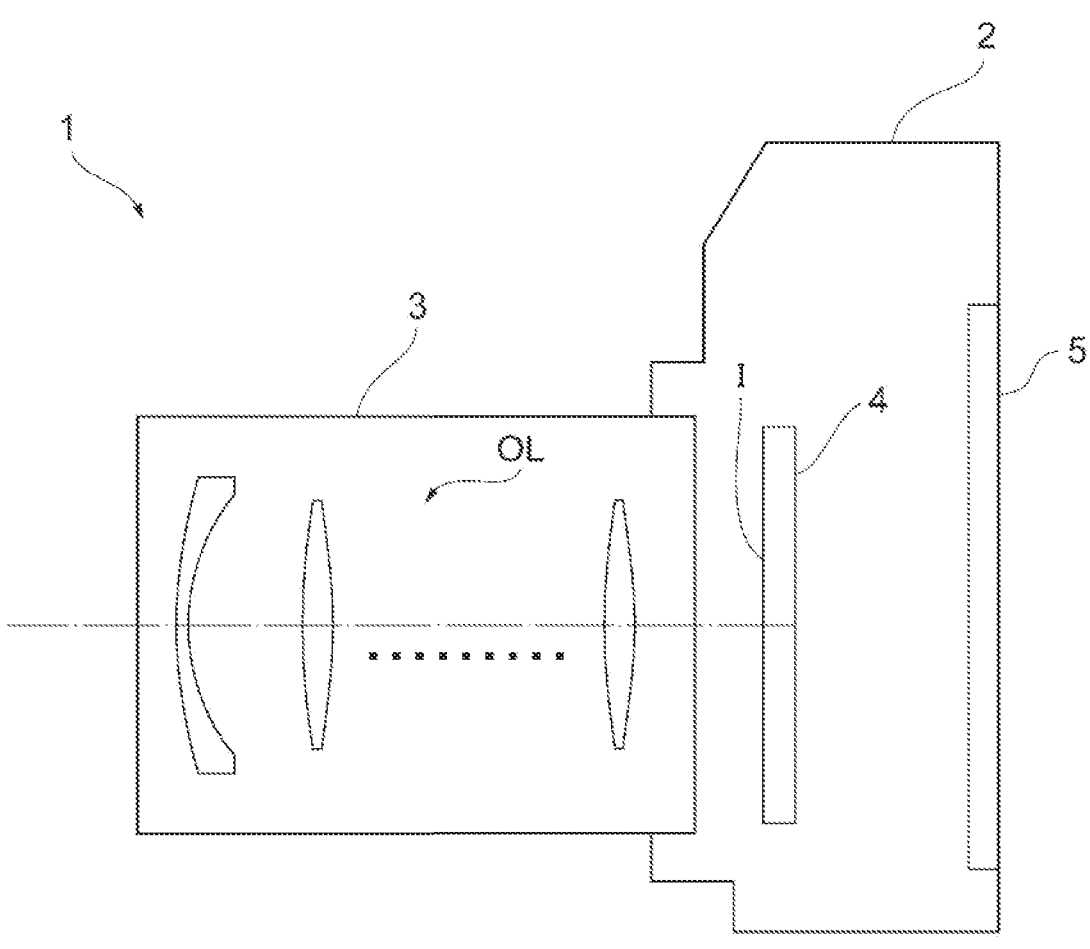
FIG. 11 shows a configuration of a camera that includes the optical system according to embodiments.

Hereinafter, preferred embodiments according to the present invention are described. First, a camera (optical apparatus) that includes an optical system according to embodiments is described with reference to FIG. 11. As shown in FIG. 11, the camera 1 includes a main body 2, and a photographing lens 3 mounted on the main body 2. The main body 2 includes an image-pickup element 4, a main body control part (not shown) that controls the operation of the digital camera, and a liquid crystal screen 5. The photographing lens 3 includes an optical system OL that includes a plurality of lens groups, and a lens position control mechanism (not shown) that controls the position of each lens group. The lens position control mechanism includes sensors that detect the positions of the lens groups, motors that move the lens groups forward and backward on the optical axis, and a control circuit that drives the motors.

Light from a subject is collected by the optical system OL of the photographing lens 3, and reaches an image surface I of the image-pickup element 4. The light having reached the image surface I from the subject is photoelectrically converted by the image-pickup element 4 into digital image data, which is recorded in a memory, not shown. Digital image data recorded in the memory can be displayed on the liquid crystal screen 5 in response to the operation of a user. Note that the camera may be a mirrorless camera, or a single-lens reflex camera that includes a quick return mirror. The optical system OL shown in FIG. 11 is a schematically shown optical system included in the photographing lens 3. The lens configuration of the optical system OL is not limited to this configuration.

Figure 1:
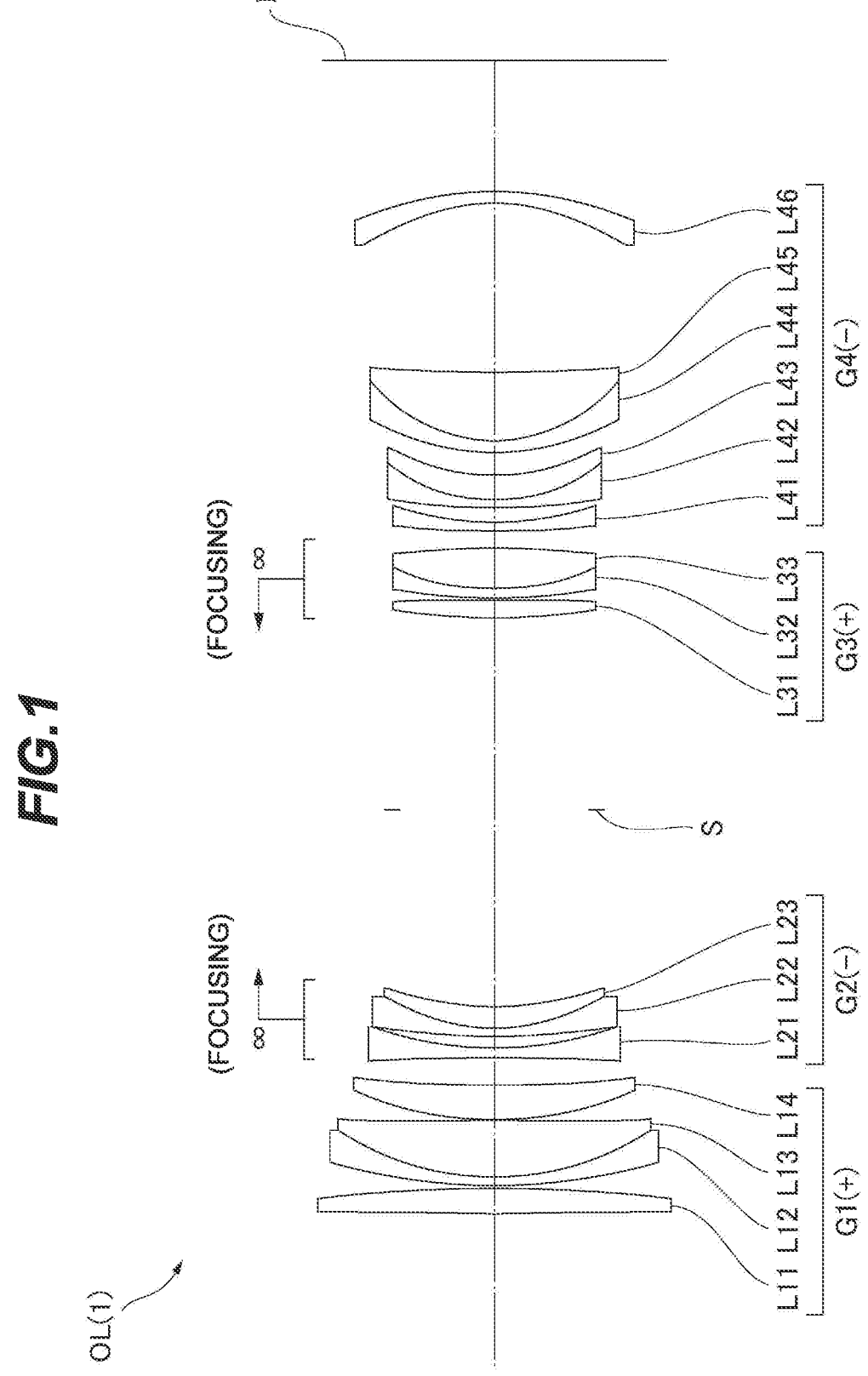
FIG. 1 shows a lens configuration of an optical system according to First Example.

Next, an optical system according to the first embodiment is described. An optical system OL(1) as an example of the optical system OL according to the first embodiment comprises, in order from an object on an optical axis, a first lens group G1 having a positive refractive power, a second lens group G2 having a negative refractive power, a third lens group G3 having a positive refractive power, and a fourth lens group G4 having a negative refractive power, as shown in FIG. 1. During focusing, the second lens group G2 and the third lens group G3 move on the optical axis, and distances between the lens groups adjacent to each other change.

In the configuration described above, in the optical system OL according to the first embodiment, the following conditional expression (1) is satisfied, $$0.20 < DG4/TL < 0.40 \tag{1}$$

where DG4: a length of the fourth lens group G4 on the optical axis, and

TL: an entire length of the optical system OL upon focusing on infinity.

According to the first embodiment, the optical system that has small aberration fluctuation during focusing, and the optical apparatus that comprises the optical system can be achieved. The optical system OL according to the first embodiment may be an optical system OL(2) shown in FIG. 3, an optical system OL(3) shown in FIG. 5, an optical system OL(4) shown in FIG. 7, or an optical system OL(5) shown in FIG. 9.

The conditional expression (1) defines an appropriate relationship between the length of the fourth lens group G4 on the optical axis, and the entire length of the optical system OL. By satisfying the conditional expression (1), the length of the fourth lens group G4 on the optical axis with respect to the entire length of the optical system OL becomes large. Consequently, over the entire range of magnification, the curvature of field and the coma aberration at the periphery can be favorably corrected. Note that in each embodiment, the entire length of the optical system OL refers to the distance on the optical axis from the most object-side lens surface to the image surface I in the optical system OL (note that the distance on the optical axis from the most image-side lens surface to the image surface I in the optical system OL is an air equivalent distance).

If the corresponding value of the conditional expression (1) deviates outside of the range, it is difficult to correct the curvature of field and the coma aberration at the periphery in part of the magnification range. By setting the lower limit value of the conditional expression (1) to 0.21, 0.23, or further to 0.25, the advantageous effects of this embodiment can be more secured. By setting the upper limit value of the conditional expression (1) to 0.38, 0.36, 0.35, or further to 0.33, the advantageous effects of this embodiment can be more secured.

Next, an optical system according to the second embodiment is described. The optical system according to the second embodiment has a configuration similar to that of the optical system OL according to the first embodiment. Consequently, the same symbols as those of the first embodiment are assigned and description is made. An optical system OL(1) as an example of the optical system OL according to the second embodiment comprises, in order from an object on an optical axis, a first lens group G1 having a positive refractive power, a second lens group G2 having a negative refractive power, a third lens group G3 having a positive refractive power, and a fourth lens group G4 having a negative refractive power, as shown in FIG. 1. During focusing, the second lens group G2 and the third lens group G3 move on the optical axis, and distances between the lens groups adjacent to each other change.

In the configuration described above, in the optical system OL according to the second embodiment, the following conditional expression (2) is satisfied, $$3.00 < (LnR2 + LnR1)/(LnR2 - LnR1) < 5.00 \tag{2}$$

where LnR1: a radius of curvature of an object-side lens surface of a negative lens disposed closest to an image in the optical system OL, and LnR2: a radius of curvature of an image-side lens surface of the negative lens disposed closest to the image in the optical system OL.

According to the second embodiment, the optical system that has small aberration fluctuation during focusing, and the optical apparatus that comprises the optical system can be achieved. The optical system OL according to the second embodiment may be an optical system OL(2) shown in FIG. 3, an optical system OL(3) shown in FIG. 5, an optical system OL(4) shown in FIG. 7, or an optical system OL(5) shown in FIG. 9.

The conditional expression (2) defines an appropriate range of the shape factor of the negative lens of the optical system OL that is disposed closest to the image. By satisfying the conditional expression (2), the curvature of field and the coma aberration can be uniformly corrected in the image surface over the entire range of magnification.

If the corresponding value of the conditional expression (2) deviates outside of the range, it is difficult to correct the curvature of field and the coma aberration uniformly in the image surface at the periphery in part of the magnification range. By setting the lower limit value of the conditional expression (2) to 3.05, 3.10, 3.15, 3.20, or further to 3.23, the advantageous effects of this embodiment can be more secured. By setting the upper limit value of the conditional expression (2) to 4.90, 4.80, 4.70, 4.60, 4.50, or further to 4.40, the advantageous effects of this embodiment can be more secured.

Next, an optical system according to the third embodiment is described. The optical system according to the third embodiment has a configuration similar to that of the optical system OL according to the first embodiment. Consequently, the same symbols as those of the first embodiment are assigned and description is made. An optical system OL(1) as an example of the optical system OL according to the third embodiment comprises, in order from an object on an optical axis, a first lens group G1 having a positive refractive power, a second lens group G2 having a negative refractive power, a third lens group G3 having a positive refractive power, and a fourth lens group G4 having a negative refractive power, as shown in FIG. 1. During focusing, the second lens group G2 and the third lens group G3 move on the optical axis, and distances between the lens groups adjacent to each other change.

In the configuration described above, in the optical system OL according to the third embodiment, the following conditional expression (3) is satisfied, $$0.75 < f1/(-f2) < 1.30 \tag{3}$$

where f1: a focal length of the first lens group G1, and f2: a focal length of the second lens group G2.

According to the third embodiment, the optical system that has small aberration fluctuation during focusing, and the optical apparatus that comprises the optical system can be achieved. The optical system OL according to the third embodiment may be an optical system OL(2) shown in FIG. 3, an optical system OL(3) shown in FIG. 5, an optical system OL(4) shown in FIG. 7, or an optical system OL(5) shown in FIG. 9.

The conditional expression (3) defines an appropriate relationship between the focal length of the first lens group G1 and the focal length of the second lens group G2. By satisfying the conditional expression (3), fluctuation in the spherical aberration and the curvature of field during focusing from the infinity object to the short-distance object can be suppressed.

If the corresponding value of the conditional expression (3) deviates outside of the range, it is difficult to suppress fluctuation in the spherical aberration and the curvature of field during focusing. By setting the lower limit value of the conditional expression (3) to 0.80, 0.90, 0.95, 1.00, 1.05, or further to 1.10, the advantageous effects of this embodiment can be more secured. By setting the upper limit value of the conditional expression (3) to 1.28, 1.25, 1.23, or further to 1.20, the advantageous effects of this embodiment can be more secured.

Next, an optical system according to the fourth embodiment is described. The optical system according to the fourth embodiment has a configuration similar to that of the optical system OL according to the first embodiment. Consequently, the same symbols as those of the first embodiment are assigned and description is made. An optical system OL(1) as an example of the optical system OL according to the fourth embodiment comprises, in order from an object on an optical axis, a first lens group G1 having a positive refractive power, a second lens group G2 having a negative refractive power, a third lens group G3 having a positive refractive power, and a fourth lens group G4 having a negative refractive power, as shown in FIG. 1. During focusing, the second lens group G2 and the third lens group G3 move on the optical axis, and distances between the lens groups adjacent to each other change.

In the configuration described above, in the optical system OL according to the fourth embodiment, the following conditional expressions (4) to (6) are satisfied, $$1.80 < ndM1 \tag{4}$$

$$vdM1 < 26.00 \tag{5}$$

$$\theta gFM1 - (0.6415 - 0.00162 \times vdM1) < 0.0120 \tag{6}$$

where ndM1: a refractive index of the negative lens of the first lens group G1 for d-line, vdM1: an Abbe number of the negative lens of the first lens group G1, and $\theta gFM1$: a partial dispersion ratio of the negative lens of the first lens group G1, which is defined by the following expression, $$\theta gFM1 = (ngM1 - nFM1)/(nFM1 - nCM1),$$

where ngM1 is a refractive index of the negative lens of the first lens group G1 for g-line, nFM1 is a refractive index of the negative lens of the first lens group G1 for F-line, and nCM1 is a refractive index of the negative lens of the first lens group G1 for C-line.

According to the fourth embodiment, the optical system that has small aberration fluctuation during focusing, and the optical apparatus that comprises the optical system can be achieved. The optical system OL according to the fourth embodiment may be an optical system OL(2) shown in FIG.

Figure 5:
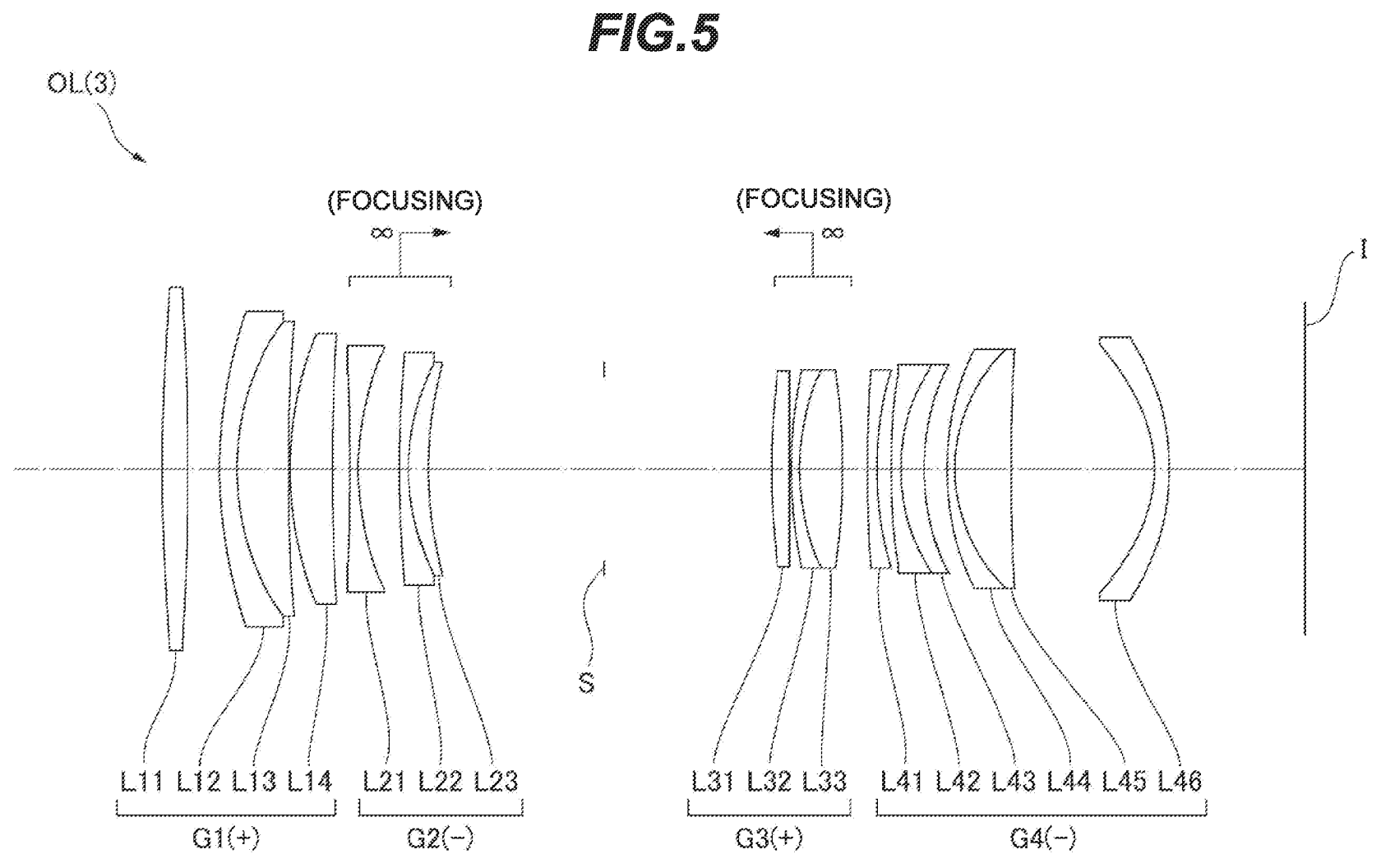
Figure 7:
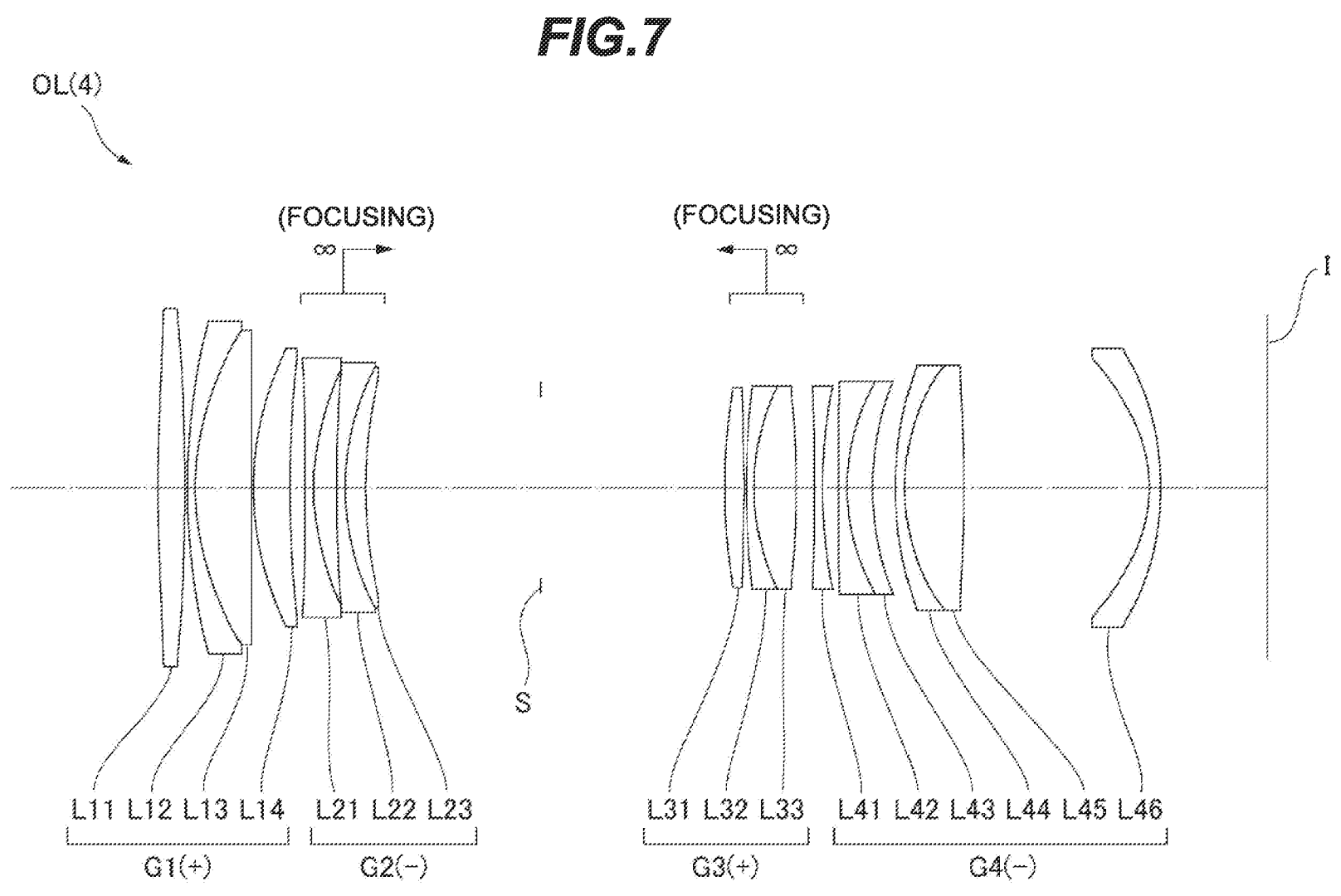
Figure 9:
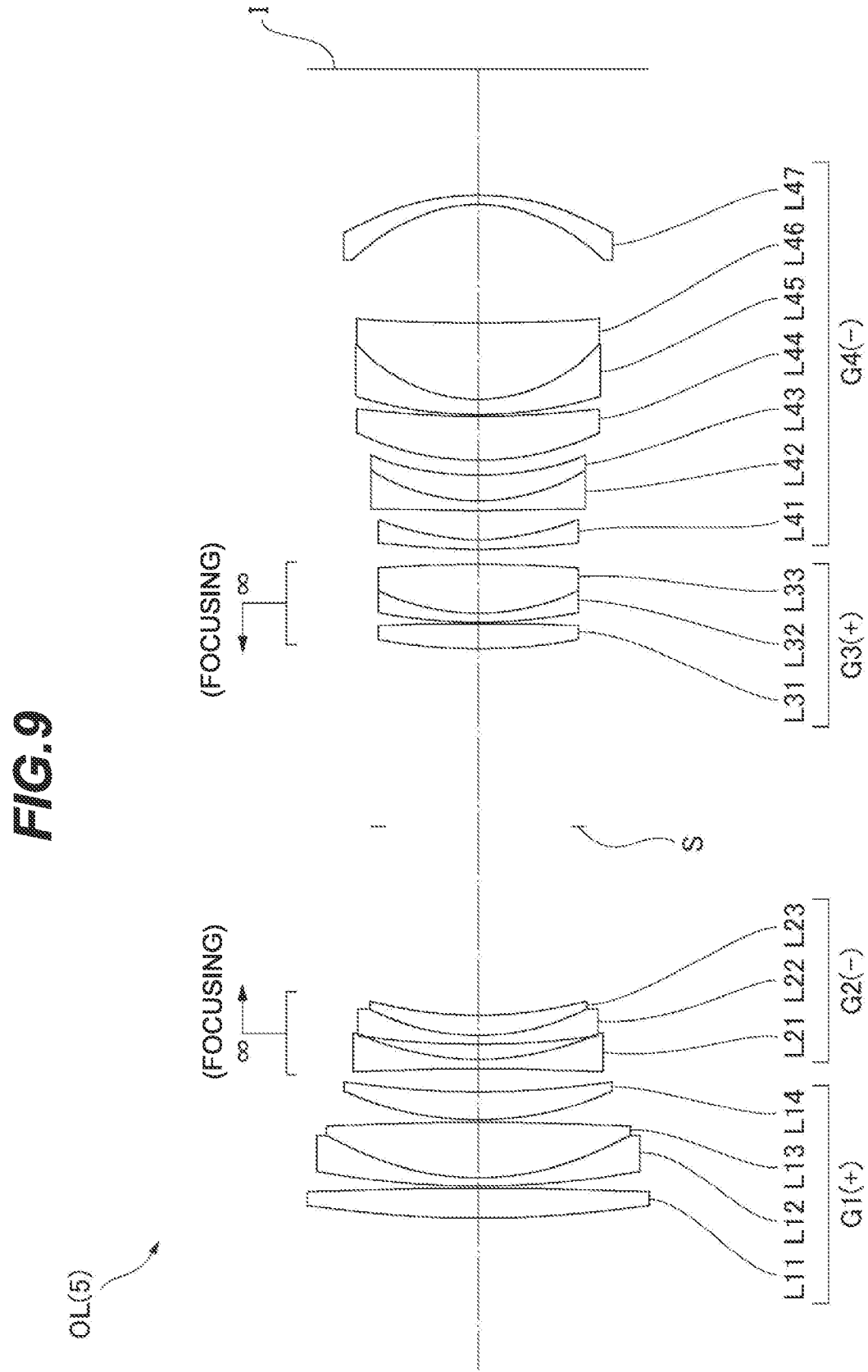
FIG. 9 shows a lens configuration of an optical system according to Fifth Example.

3, an optical system OL(3) shown in FIG. 5, an optical system OL(4) shown in FIG. 7, or an optical system OL(5) shown in FIG. 9.

The conditional expression (4) defines an appropriate range of the refractive index of the negative lens of the first lens group G1 for d-line. The conditional expression (5) defines an appropriate range of the Abbe number of the negative lens of the first lens group G1. The conditional expression (6) defines an appropriate relationship between the partial dispersion ratio and the Abbe number of the negative lens of the first lens group G1. By satisfying the conditional expressions (4) to (6), the longitudinal chromatic aberration and the chromatic aberration of magnification can be favorably corrected over the entire range of magnification.

If the corresponding value of the conditional expression (4) deviates outside of the range, it is difficult to correct the longitudinal chromatic aberration and the chromatic aberration of magnification in part of the magnification range. By setting the lower limit value of the conditional expression (4) to 1.82, 1.83, or further to 1.84, the advantageous effects of this embodiment can be more secured.

If the corresponding value of the conditional expression (5) deviates outside of the range, it is difficult to correct the longitudinal chromatic aberration and the chromatic aberration of magnification in part of the magnification range. By setting the upper limit value of the conditional expression (5) to 25.90, 25.85, 25.70, 25.50, or further to 25.35, the advantageous effects of this embodiment can be more secured.

If the corresponding value of the conditional expression (6) deviates outside of the range, it is difficult to correct the longitudinal chromatic aberration and the chromatic aberration of magnification in part of the magnification range. By setting the upper limit value of the conditional expression (6) to 0.0115, 0.0110, 0.0105, 0.0100, or further to 0.0098, the advantageous effects of this embodiment can be more secured. The lower limit of the conditional expression (6) may be higher than 0.0000.

Preferably, in the optical systems OL according to the second to fourth embodiments, the conditional expression (1) described above is satisfied. By satisfying the conditional expression (1), similar to the first embodiment, the curvature of field and the coma aberration at the periphery can be favorably corrected over the entire range of magnification. By setting the lower limit value of the conditional expression (1) to 0.21, 0.23, or further to 0.25, the advantageous effects of each embodiment can be more secured. By setting the upper limit value of the conditional expression (1) to 0.38, 0.36, 0.35, or further to 0.33, the advantageous effects of each embodiment can be more secured.

Preferably, in the optical systems OL according to the third and fourth embodiments, the conditional expression (2) described above is satisfied. By satisfying the conditional expression (2), similar to the second embodiment, the curvature of field and the coma aberration can be uniformly corrected in the image surface over the entire range of magnification. By setting the lower limit value of the conditional expression (2) to 3.05, 3.10, 3.15, 3.20, or further to 3.23, the advantageous effects of each embodiment can be more secured. By setting the upper limit value of the conditional expression (2) to 4.90, 4.80, 4.70, 4.60, 4.50, or further to 4.40, the advantageous effects of each embodiment can be more secured.

Preferably, in the optical system OL according to the fourth embodiment, the conditional expression (3) described above is satisfied. By satisfying the conditional expression (3), similar to the third embodiment, fluctuation in the spherical aberration and the curvature of field during focusing from the infinity object to the short-distance object can be suppressed. By setting the lower limit value of the conditional expression (3) to 0.80, 0.90, 0.95, 1.00, 1.05, or further to 1.10, the advantageous effects of this embodiment can be more secured. By setting the upper limit value of the conditional expression (3) to 1.28, 1.25, 1.23, or further to 1.20, the advantageous effects of this embodiment can be more secured.

Preferably, in the optical systems OL according to the first to fourth embodiments, the following conditional expression (7) is satisfied, $$0.75 < f1/f3 < 1.20 \qquad (7)$$

where f1: a focal length of the first lens group G1, and f3: a focal length of the third lens group G3.

The conditional expression (7) defines an appropriate relationship between the focal length of the first lens group G1 and the focal length of the third lens group G3. By satisfying the conditional expression (7), fluctuation in the spherical aberration and the curvature of field during focusing from the infinity object to the short-distance object can be suppressed.

If the corresponding value of the conditional expression (7) deviates outside of the range, it is difficult to suppress fluctuation in the spherical aberration and the curvature of field during focusing. By setting the lower limit value of the conditional expression (7) to 0.80, 0.85, 0.90, 0.95, or further to 1.00, the advantageous effects of each embodiment can be more secured. By setting the upper limit value of the conditional expression (7) to 1.18, 1.15, 1.13, or further to 1.10, the advantageous effects of each embodiment can be more secured.

Preferably, in the optical systems OL according to the first to fourth embodiments, the following conditional expression (8) is satisfied, $$0.45 < (-\beta) \qquad (8)$$

where β: a lateral magnification of the optical system OL.

The conditional expression (8) defines an appropriate range of the lateral magnification of the entire optical system OL. By satisfying the conditional expression (8), photographing at a very short distance is allowed, which is preferable. By setting the lower limit value of the conditional expression (8) to 0.52, 0.55, 0.60, 0.70, 0.75, or further to 0.80, the advantageous effects of each embodiment can be more secured.

Preferably, in the optical systems OL according to the first to fourth embodiments, the following conditional expression (9) is satisfied, $$35.0 < \beta2/\beta3 < 350.0 \qquad (9)$$

where β2: a lateral magnification of the second lens group G2 upon focusing on infinity, and β3: a lateral magnification of the third lens group G3 upon focusing on infinity.

The conditional expression (9) defines an appropriate relationship between the lateral magnification of the second lens group G2 upon focusing on infinity, and the lateral magnification of the third lens group G3 upon focusing on infinity. By satisfying the conditional expression (9), the fluctuation in the curvature of field and the spherical aberration during focusing can be suppressed.

If the corresponding value of the conditional expression (9) deviates outside of the range, it is difficult to suppress fluctuation in the curvature of field and the spherical aberration during focusing. By setting the lower limit value of the conditional expression (9) to 35.50, 36.00, 36.50, 37.00, or further to 37.30, the advantageous effects of each embodiment can be more secured. By setting the upper limit value of the conditional expression (9) to 300.00, 250.00, 200.00, 150.00, 100.00, 85.00, or further to 75.00, the advantageous effects of each embodiment can be more secured.

In the optical systems OL according to the first to fourth embodiments, the following conditional expression (10) may be satisfied, $$0.005 < \beta3/\beta2 < 0.035 \qquad (10)$$

where β2: a lateral magnification of the second lens group G2 upon focusing on infinity, and β3: a lateral magnification of the third lens group G3 upon focusing on infinity.

The conditional expression (10) defines an appropriate relationship between the lateral magnification of the second lens group G2 and the lateral magnification of the third lens group G3 upon focusing on infinity. By satisfying the conditional expression (10), the fluctuation in the curvature of field and the spherical aberration during focusing can be suppressed.

If the corresponding value of the conditional expression (10) deviates outside of the range, it is difficult to suppress fluctuation in the curvature of field and the spherical aberration during focusing. By setting the lower limit value of the conditional expression (10) to 0.008, 0.010, or further to 0.012, the advantageous effects of each embodiment can be more secured. By setting the upper limit value of the conditional expression (10) to 0.033, 0.030, or further to 0.029, the advantageous effects of each embodiment can be more secured.

Preferably, in the optical systems OL according to the first to fourth embodiments, the following conditional expression (11) is satisfied, $$\{\beta2 + (1/\beta2)\}^{-2} < 0.10 \qquad (11)$$

where β2: a lateral magnification of the second lens group G2 upon focusing on infinity.

The conditional expression (11) defines an appropriate range of the lateral magnification of the second lens group G2 upon focusing on infinity. By satisfying the conditional expression (11), the various aberrations, such as the spherical aberration and the curvature of field, upon focusing on infinity can be favorably corrected.

If the corresponding value of the conditional expression (11) deviates outside of the range, it is difficult to correct various aberrations, such as the spherical aberration and the curvature of field, upon focusing on infinity. By setting the upper limit value of the conditional expression (11) to 0.08, 0.06, or further to 0.05, the advantageous effects of each embodiment can be more secured.

Preferably, in the optical systems OL according to the first to fourth embodiments, the following conditional expression (12) is satisfied, $$\{\beta + (1/\beta3)\}^{-2} < 0.10 \qquad (12)$$

where β3: a lateral magnification of the third lens group G3 upon focusing on infinity.

The conditional expression (12) defines an appropriate range of the lateral magnification of the third lens group G3 upon focusing on infinity. By satisfying the conditional expression (12), the various aberrations, such as the spherical aberration and the curvature of field, upon focusing on infinity can be favorably corrected.

If the corresponding value of the conditional expression (12) deviates outside of the range, it is difficult to correct various aberrations, such as the spherical aberration and the curvature of field, upon focusing on infinity. By setting the upper limit value of the conditional expression (12) to 0.08, 0.06, or further to 0.05, the advantageous effects of each embodiment can be more secured.

Preferably, in the optical systems OL according to the first to fourth embodiments, the following conditional expression (13) is satisfied, $$0.05 < Bf/TL < 0.35 \qquad (13)$$

where Bf: a back focus of the optical system OL upon focusing on infinity, and

TL: an entire length of the optical system OL upon focusing on infinity.

The conditional expression (13) defines an appropriate relationship between the back focus of the optical system OL and the entire length of the optical system OL. Note that in each embodiment, the back focus of the optical system OL is the distance on the optical axis from the most image-side lens surface to the image surface I in the optical system OL (air equivalent distance). By satisfying the conditional expression (13), the optical system that has a short back focus while favorably suppressing occurrence of various aberrations can be achieved. By setting the lower limit value of the conditional expression (13) to 0.06, 0.07, or further to 0.08, the advantageous effects of each embodiment can be more secured. By setting the upper limit value of the conditional expression (13) to 0.33, 0.30, 0.25, 0.20, 0.18, or further to 0.15, the advantageous effects of each embodiment can be more secured.

Preferably, in the optical systems OL according to the first to fourth embodiments, the following conditional expression (14) is satisfied, $$0.10 < Bf/f < 0.50 \qquad (14)$$

where Bf: a back focus of the optical system OL upon focusing on infinity, and f: a focal length of the optical system OL.

The conditional expression (14) defines an appropriate relationship between the back focus of the optical system OL and the focal length of the optical system OL. By satisfying the conditional expression (14), the optical system that has a short back focus while favorably suppressing occurrence of various aberrations can be achieved. By setting the lower limit value of the conditional expression (14) to 0.12, 0.14, or further to 0.15, the advantageous effects of each embodiment can be more secured. By setting the upper limit value of the conditional expression (20) to 0.45, 0.40, 0.35, 0.30, 0.25, or further to 0.20, the advantageous effects of each embodiment can be more secured.

Preferably, the optical systems OL according to the first to fourth embodiments include a stop (aperture stop) S, and the following conditional expression (15) is satisfied, $$0.50 < L1S/SLn < 1.00 \qquad (15)$$

where L1S: a distance on the optical axis from a most object-side lens surface of the optical system OL to the aperture stop S upon focusing on infinity, and SLn: a distance on the optical axis from the aperture stop S to a most image-side lens surface of the optical system OL upon focusing on infinity.

The conditional expression (15) defines an appropriate relationship between the distance on the optical axis from the most object-side lens surface to the aperture stop S in the optical system OL, and the distance on the optical axis from the aperture stop S to the most image-side lens surface in the optical system OL. By satisfying the conditional expression (15), the optical system that favorably suppress occurrence of various aberrations at the periphery can be achieved. By setting the lower limit value of the conditional expression (15) to 0.52, 0.55, 0.58, or further to 0.60, the advantageous effects of each embodiment can be more secured. By setting the upper limit value of the conditional expression (15) to 0.95, 0.90, 0.88, 0.85, 0.83, or further to 0.80, the advantageous effects of each embodiment can be more secured. Preferably, the aperture stop (aperture stop) S is disposed between the second lens group G2 and the third lens group G3.

Preferably, in the optical systems OL according to the first to fourth embodiments, the following conditional expression (16) is satisfied, $$0.70 < Mf2/Mf3 < 1.10 \qquad (16)$$

where Mf2: an absolute value of an amount of movement of the second lens group G2 during focusing from an infinity object to a shortest-distance object, and Mf3: an absolute value of an amount of movement of the third lens group G3 during focusing from the infinity object to the shortest-distance object.

The conditional expression (16) defines an appropriate relationship between the amount of movement of the second lens group G2 and the amount of movement of the third lens group G3 during focusing. Note that the shortest distance corresponds to the shortest photographing distance. By satisfying the conditional expression (16), fluctuation in the spherical aberration and the curvature of field during focusing from the infinity object to the short-distance object can be suppressed.

If the corresponding value of the conditional expression (16) deviates outside of the range, it is difficult to suppress fluctuation in the spherical aberration and the curvature of field during focusing. By setting the lower limit value of the conditional expression (16) to 0.73, 0.75, 0.78, 0.80, or further to 0.82, the advantageous effects of each embodiment can be more secured. By setting the upper limit value of the conditional expression (16) to 0.99, 0.98, or further to 0.97, the advantageous effects of each embodiment can be more secured.

Preferably, in the optical systems OL according to the first to fourth embodiments, the third lens group G3 includes a negative lens in which the following conditional expressions (17) to (19) are satisfied, $$1.80 < ndM3 \qquad (17)$$

$$vdM3 < 26.00 \qquad (18)$$

$$\theta gFM3 - (0.6415 - 0.00162 \times vdM3) < 0.0120 \qquad (19)$$

where ndM3: a refractive index of the negative lens of the third lens group G3 for d-line, vdM3: an Abbe number of the negative lens of the third lens group G3, and $\theta gFM3$: a partial dispersion ratio of the negative lens of the third lens group G3, which is defined by the following expression, $$\theta gFM3 = (ngM3 - nFM3)/(nFM3 - nCM3),$$

where ngM3 is a refractive index of the negative lens of the third lens group G3 for g-line, nFM3 is a refractive index of the negative lens of the third lens group G3 for F-line, and nCM3 is a refractive index of the negative lens of the third lens group G3 for C-line.

The conditional expression (17) defines an appropriate range of the refractive index of the negative lens of the third lens group G3 for d-line. The conditional expression (18) defines an appropriate range of the Abbe number of the negative lens of the third lens group G3. The conditional expression (19) defines an appropriate relationship between the partial dispersion ratio and the Abbe number of the negative lens of the third lens group G3. By satisfying the conditional expressions (17) to (19), fluctuation in the longitudinal chromatic aberration during focusing from the infinity object to the short-distance object can be suppressed.

If the corresponding value of the conditional expression (17) deviates outside of the range, it is difficult to suppress fluctuation in the longitudinal chromatic aberration during focusing. By setting the lower limit value of the conditional expression (17) to 1.82, 1.83, or further to 1.84, the advantageous effects of each embodiment can be more secured.

If the corresponding value of the conditional expression (18) deviates outside of the range, it is difficult to suppress fluctuation in the longitudinal chromatic aberration during focusing. By setting the upper limit value of the conditional expression (18) to 25.90, 25.85, 25.70, 25.50, or further to 25.35, the advantageous effects of each embodiment can be more secured.

If the corresponding value of the conditional expression (19) deviates outside of the range, it is difficult to suppress fluctuation in the longitudinal chromatic aberration during focusing. By setting the upper limit value of the conditional expression (19) to 0.0115, 0.0110, 0.0105, 0.0100, or further to 0.0098, the advantageous effects of each embodiment can be more secured. The lower limit of the conditional expression (19) may be higher than 0.0000.

Preferably, in the optical systems OL according to the first to fourth embodiments, the following conditional expression (20) is satisfied, $$(L1R2+L1R1)/(L1R2-L1R1)<0.10 \qquad (20)$$

where L1R1: a radius of curvature of an object-side lens surface of a positive lens disposed closest to the object in the optical system OL, and L1R2: a radius of curvature of an image-side lens surface of the positive lens disposed closest to the object in the optical system OL.

The conditional expression (20) defines an appropriate range of the shape factor of the positive lens disposed closest to the object in the optical system OL. By satisfying the conditional expression (20), the spherical aberration upon focusing on infinity can be favorably corrected.

If the corresponding value of the conditional expression (20) deviates outside of the range, it is difficult to correct the spherical aberration upon focusing on infinity. By setting the upper limit value of the conditional expression (20) to 0.00, −0.01, −0.03, −0.08, −0.10, −0.30, −0.50, or further to −0.60, the advantageous effects of each embodiment can be more secured. The lower limit value of the conditional expression (20) may be set to −2.00, −1.80, −1.50, −1.45, or further to −1.40.

Preferably, in the optical systems OL according to the first to fourth embodiments, a lens disposed closest to an image in the fourth lens group G4 has a negative refractive power. Thus, over the entire range of magnification, the curvature of field and the coma aberration at the periphery can be favorably corrected.

In the optical systems OL according to the first to fourth embodiments, during focusing from an infinity object to a short-distance object, the second lens group G2 moves toward an image on the optical axis, and the third lens group G3 moves toward the object on the optical axis. Preferably, in the optical systems OL according to the first to fourth embodiments, during focusing, the position of the first lens group G1 is fixed with reference to the image surface I. Preferably, in the optical systems OL according to the first to fourth embodiments, during focusing, the position of the fourth lens group G4 is fixed with reference to the image surface I. Thus, the aberration fluctuation during focusing can be suppressed.

Preferably, in the optical systems OL according to the first to fourth embodiments, at least one lens surface of the negative lens disposed closest to the image in the optical system OL is an aspherical surface. Thus, the curvature of field can be uniformly corrected in the image surface.

Figure 12:
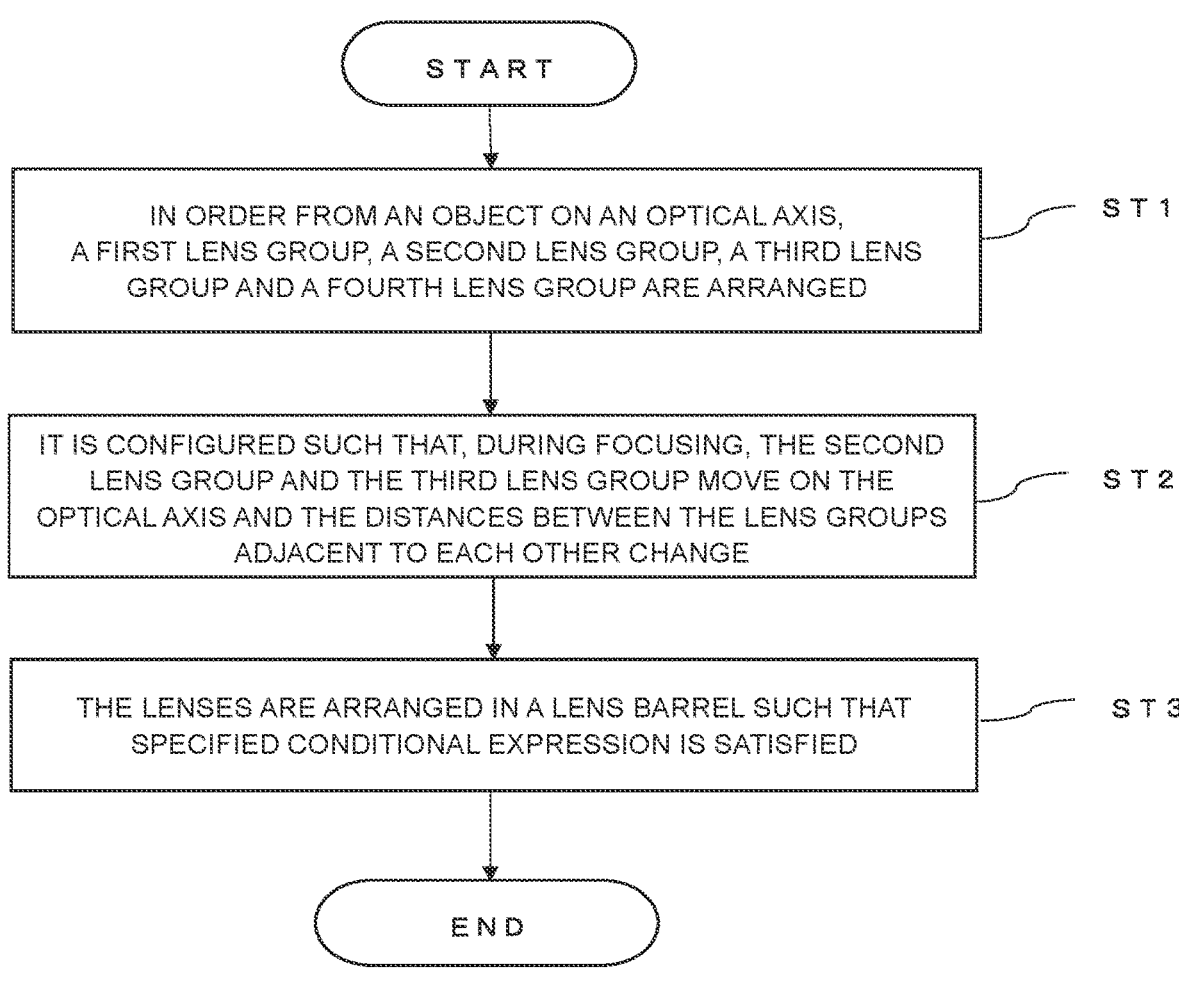
FIG. 12 is a flowchart showing a method for manufacturing the optical system according to first to third embodiments.

Subsequently, referring to FIG. 12, a method for manufacturing the optical system OL according to the first embodiment is schematically described. First, in order from an object on an optical axis, a first lens group G1 having a positive refractive power, a second lens group G2 having a negative refractive power, a third lens group G3 having a positive refractive power, and a fourth lens group G4 having a negative refractive power are arranged (Step ST1). Next, it is configured such that, during focusing, the second lens group G2 and the third lens group G3 move on the optical axis and the distances between the lens groups adjacent to each other change (step ST2). The lenses are arranged in a lens barrel such that at least the conditional expression (1) described above is satisfied (step ST3). According to such a manufacturing method, the optical system having small aberration fluctuation during focusing can be manufactured.

Subsequently, a method for manufacturing the optical system OL according to the second embodiment is schematically described. The method for manufacturing the optical system OL according to the second embodiment is similar to the manufacturing method described in the first embodiment. Accordingly, description is made with reference to FIG. 12 as with the first embodiment. First, in order from an object on an optical axis, a first lens group G1 having a positive refractive power, a second lens group G2 having a negative refractive power, a third lens group G3 having a positive refractive power, and a fourth lens group G4 having a negative refractive power are arranged (Step ST1). Next, it is configured so that, during focusing, the second lens group G2 and the third lens group G3 move on the optical axis and the distances between the lens groups adjacent to each other change (step ST2). The lenses are arranged in a lens barrel such that at least the conditional expression (2) described above is satisfied (step ST3). According to such a manufacturing method, the optical system having small aberration fluctuation during focusing can be manufactured.

Subsequently, a method for manufacturing the optical system OL according to the third embodiment is schematically described. The method for manufacturing the optical system OL according to the third embodiment is similar to the manufacturing method described in the first embodiment. Accordingly, description is made with reference to FIG. 12 as with the first embodiment. First, in order from an object on an optical axis, a first lens group G1 having a positive refractive power, a second lens group G2 having a negative refractive power, a third lens group G3 having a positive refractive power, and a fourth lens group G4 having a negative refractive power are arranged (Step ST1). Next, it is configured such that, during focusing, the second lens group G2 and the third lens group G3 move on the optical axis and the distances between the lens groups adjacent to each other change (step ST2). The lenses are arranged in a lens barrel such that at least the conditional expression (3) described above is satisfied (step ST3). According to such a manufacturing method, the optical system having small aberration fluctuation during focusing can be manufactured.

Figure 13:
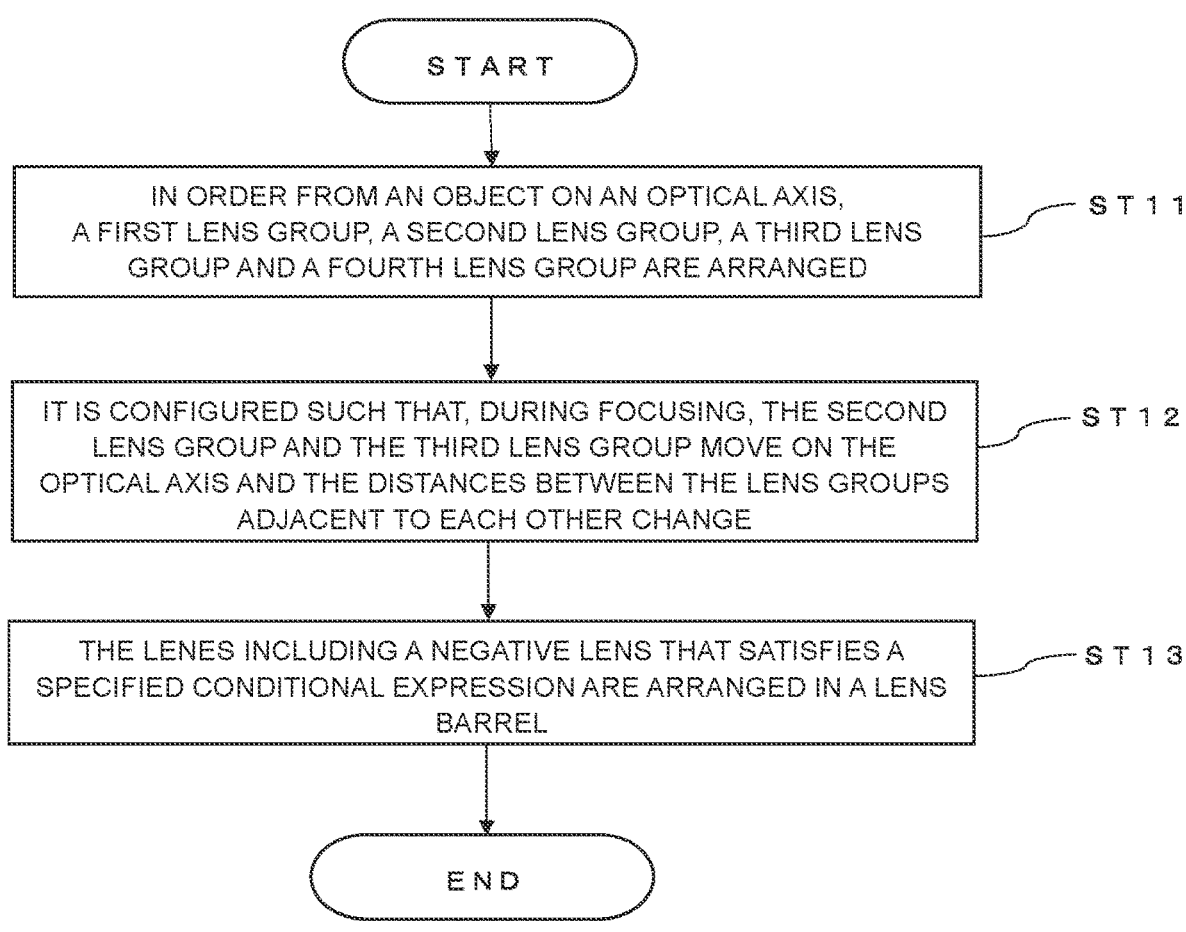
FIG. 13 is a flowchart showing a method for manufacturing the optical system according to a fourth embodiment.

Subsequently, referring to FIG. 13, a method for manufacturing the optical system OL according to the fourth embodiment is schematically described. First, in order from an object on an optical axis, a first lens group G1 having a positive refractive power, a second lens group G2 having a negative refractive power, a third lens group G3 having a positive refractive power, and a fourth lens group G4 having a negative refractive power are arranged (Step ST11). Next, it is configured such that, during focusing, the second lens group G2 and the third lens group G3 move on the optical axis and the distances between the lens groups adjacent to each other change (step ST12). The lenses are arranged in a lens barrel such that at least the first lens group G1 includes a negative lens in which the conditional expressions (4) to (6) described above are satisfied (step ST13). According to such a manufacturing method, the optical system having small aberration fluctuation during focusing can be manufactured.

EXAMPLES

Hereinafter, optical systems OL according to Examples of the embodiments are described with reference to the drawings. FIGS. 1, 3, 5, 7 and 9 are sectional views showing the configurations and refractive power allocations of the optical systems OL {OL(1) to OL(5)} according to First to Fifth Examples. In the sectional views of the optical systems OL(1) to OL(5) according to First to Fifth Examples, the moving directions of the lens groups on the optical axis during focusing from infinity to the short-distance object (finite-distance object) are indicated by arrows accompanied by characters of "FOCUSING".

In FIGS. 1, 3, 5, 7 and 9, each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently for each Example. Accordingly, even when the same combination of a symbol and a numeral is used among Examples, such usage does not necessarily mean the same configuration.

Tables 1 to 5 are hereinafter shown. Among these tables, Table 1 is a table showing each data item in First Example, Table 2 is that in Second Example, Table 3 is that in Third Example, Table 4 is that in Fourth Example, and Table 5 is that in Fifth Example. In each Example, for calculation of aberration characteristics, d-line (wavelength $\lambda$=587.6 nm), g-line (wavelength $\lambda$=435.8 nm), C-line (wavelength $\lambda$=656.3 nm) and F-line (wavelength $\lambda$=486.1 nm) are selected.

In the table of [General Data], f indicates the focal length of the entire optical system, $2\omega$ indicates the angle of view (the unit is ° (degree), and $\omega$ indicates the half angle of view), and Ymax indicates the maximum image height. TL indicates a distance obtained by adding Bf to the distance from the lens foremost surface to the lens last surface on the optical axis upon focusing on infinity. Bf indicates the air equivalent distance (back focus) from the lens last surface to the image surface on the optical axis upon focusing on infinity. In the table of [General Data], $\beta$2 indicates the lateral magnification of the second lens group upon focusing on infinity. $\beta$3 indicates the lateral magnification of the third lens group G3 upon focusing on infinity. Mf2 indicates the absolute value of the amount of movement of the second lens group during focusing from an infinity object to a shortest-distance object. Mf3 indicates the absolute value of the amount of movement of the third lens group during focusing from an infinity object to a shortest-distance object.

In the table of [Lens Data], Surface Number indicates the order of the optical surface from the object side along the direction in which a light beam travels, R indicates the radius of curvature (the surface whose center of curvature resides on the image side is regarded to have a positive value) of each optical surface, D indicates the surface distance that is the distance on the optical axis from each optical surface to the next optical surface (or the image surface), nd is the refractive index of the material of the optical member for d-line, $\nu$d indicates the Abbe number of the material of the optical member with reference to d-line, and $\theta$gF indicates the partial dispersion ratio of the material of the optical member. The radius of curvature "∞" indicates a plane or an opening. (Stop S) indicates an aperture stop S. The description of the air refractive index nd=1.00000 is omitted. In a case where the optical surface is an aspherical surface, the surface number is assigned a symbol *, and in the field of the radius of curvature R, the paraxial radius of curvature is indicated.

The refractive index of the material of the optical member for g-line (wavelength $\lambda$=435.8 nm) is referred to as ng, the refractive index of the material of the optical member for F-line (wavelength $\lambda$=486.1 nm) is referred to as nF, and the refractive index of the material of the optical member for C-line (wavelength $\lambda$=656.3 nm) is referred to as nC. In this case, the partial dispersion ratio $\theta$gF of the material of the optical member is defined by the following expression (A).

$$\theta gF = (ng - nF)/(nF - nC) \tag{A}$$

In the table of [Aspherical Surface Data], the shape of the aspherical surface indicated in [Lens Data] is indicated by the following expression (B). X(y) indicates the distance (sag amount) on the optical axis direction from the tangent plane at the vertex of the aspherical surface to the position on the aspherical surface at the height y, R indicates the radius of curvature of the reference spherical surface (paraxial radius of curvature), $\kappa$ indicates the conic constant, and Ai indicates the i-th aspherical coefficient. "E-n" indicates "$\times 10^{-n}$". For example, $1.234E-05 = 1.234 \times 10^{-5}$. Note that the secondary aspherical coefficient A2 is zero, the description of which is omitted.

$$X(y) = (y^2/R)/\{1(1 - \kappa \times y^2/R^2)^{1/2}\} A4 \times y^4 + A6 \times y^6 + A8 \times y^8 + A10 \times y^{10} + A12 \times y^{12} \tag{B}$$

The table of [Variable Distance Data] shows the surface distance at each surface number i where the surface distance is (Di) in the table of [Lens Data]. Note that D0 indicates the distance from the object to the optical surface closest to the object in the optical system. In the table of [Variable Distance Data], f indicates the focal length of the entire optical system, $\beta$ indicates the photographing magnification (lateral magnification) of the optical system, and FNO indicates the f-number of the optical system.

The table of [Lens Group Data] shows the first surface (the surface closest to the object) and the focal length of each lens group.

Hereinafter, at all the data values, the listed focal length f, radius of curvature R, surface distance D, other lengths and the like are generally represented in "mm" if not otherwise specified. However, even after subjected to proportional scaling in or out, the optical system can achieve equivalent optical performances. Accordingly, the representation is not limited to this example.

The descriptions of the tables so far are common to all Examples. Redundant descriptions are hereinafter omitted.

First Example

First Example is described with reference to FIGS. 1 and 2A and 2B and Table 1. FIG. 1 shows a lens configuration of an optical system according to First Example. The optical system OL(1) according to First Example comprises, in order from an object on the optical axis, a first lens group G1 having a positive refractive power, a second lens group G2 having a negative refractive power, a third lens group G3 having a positive refractive power, and a fourth lens group G4 having a negative refractive power. During focusing from the infinity object to the short-distance object, the second lens group G2 moves toward the image on the optical axis, the third lens group G3 moves toward the object on the optical axis, and the distances between the lens groups adjacent to each other change. Note that, during focusing, the positions of the first lens group G1 and the fourth lens group G4 are fixed with respect to the image surface I. The aperture stop S is disposed between the second lens group G2 and the third lens group G3. During focusing, the position of the aperture stop S is fixed with respect to the image surface I. The sign (+) or (−) assigned to each lens group symbol indicates the refractive power of the corresponding lens group. This indication similarly applies to all the following Examples.

The first lens group G1 comprises, in order from the object on the optical axis, a biconvex positive lens L11, a cemented lens including a negative meniscus lens L12 having a convex surface facing the object and a positive meniscus lens L13 having a convex surface facing the object which are cemented to each other, and a positive meniscus lens L14 having a convex surface facing the object. In this Example, the negative meniscus lens L12 of the first lens group G1 corresponds to the negative lens in which the conditional expressions (4) to (6) are satisfied.

The second lens group G2 comprises, in order from the object on the optical axis, a biconcave negative lens L21, and a cemented lens including a negative meniscus lens L22 having a convex surface facing the object and a positive meniscus lens L23 having a convex surface facing the object which are cemented to each other.

The third lens group G3 comprises, in order from the object on the optical axis, a biconvex positive lens L31, and a cemented lens including a negative meniscus lens L32 having a convex surface facing the object and a biconvex positive lens L33 which are cemented to each other. In this Example, the negative meniscus lens L32 of the third lens group G3 corresponds to the negative lens in which conditional expressions (17) to (19) are satisfied.

The fourth lens group G4 comprises, in order from the object on the optical axis, a negative meniscus lens L41 having a convex surface facing the object, a cemented lens including a negative meniscus lens L42 having a convex surface facing the object and a positive meniscus lens L43 having a convex surface facing the object which are cemented to each other, a cemented lens including a negative meniscus lens L44 having a convex surface facing the object and a positive meniscus lens L45 having a convex surface facing the object which are cemented to each other, and a negative meniscus lens L46 having a concave surface facing the object. The negative meniscus lens L46 includes an object-side lens surface that is an aspherical surface. The image surface I is disposed on the image side of the fourth lens group G4.

The following Table 1 lists values of data on the optical system according to First Example.

TABLE 1

| [General Data] | |
| --- | --- |
| f = 102.86 | β2 = 8.163 |
| 2ω = 24.06 | β3 = 0.151 |
| Ymax = 21.70 | Mf2 = 18.956 |
| TL = 149.38 | Mf3 = 20.740 |
| Bf = 16.78 | |

[Lens Data]

| Surface Number | R | D | nd | νd | θgF |
| --- | --- | --- | --- | --- | --- |
| Object Surface | ∞ | (D0) | | | |
| 1 | 1598.6404 | 3.330 | 1.83481 | 42.73 | |
| 2 | −179.4707 | 0.200 | | | |
| 3 | 80.9451 | 1.200 | 1.85451 | 25.15 | 0.6103 |
| 4 | 38.9730 | 7.070 | 1.59319 | 67.90 | |
| 5 | 865.5813 | 0.200 | | | |
| 6 | 47.0836 | 4.570 | 1.59319 | 67.90 | |
| 7 | 210.0810 | (D7) | | | |
| 8 | −242.9579 | 1.100 | 1.51860 | 69.89 | |
| 9 | 48.3271 | 1.613 | | | |
| 10 | 122.3852 | 1.100 | 1.72047 | 34.71 | |
| 11 | 28.6090 | 2.660 | 1.94595 | 17.98 | |
| 12 | 44.8866 | (D12) | | | |
| 13 | ∞ | (D13) | | | (Aperture Stop S) |
| 14 | 85.7680 | 2.400 | 1.83481 | 42.72 | |
| 15 | −644.4854 | 0.200 | | | |
| 16 | 79.2129 | 1.100 | 1.85451 | 25.15 | 0.6103 |
| 17 | 32.8950 | 5.480 | 1.59319 | 67.90 | |
| 18 | −109.8711 | (D18) | | | |
| 19 | 163.4895 | 1.100 | 1.95375 | 32.33 | |
| 20 | 45.6740 | 1.840 | | | |
| 21 | 85.0464 | 1.100 | 1.51860 | 69.89 | |
| 22 | 23.8970 | 3.210 | 1.94595 | 17.98 | |
| 23 | 29.2234 | 2.983 | | | |
| 24 | 34.9435 | 1.500 | 2.00069 | 25.46 | |
| 25 | 21.6656 | 8.800 | 1.80440 | 39.61 | |
| 26 | 250.8917 | 21.970 | | | |
| 27* | −26.4605 | 1.530 | 1.51680 | 64.14 | |
| 28 | −47.3182 | Bf | | | |
| Image Surface | ∞ | | | | |

[Aspherical Surface Data]

27th Surface

κ = 1.000, A4 = 9.61768E−06, A6 = 1.56877E−08
A8 = −4.92862E−11, A10 = −1.29299E−13, A12 = −7.46540E−17

[Variable Distance Data]

| | Upon focusing on infinity f = 102.86 | Upon focusing on an intermediate distance object β = −0.5 | Upon focusing on a shortest-distance object β = −1.0 |
| --- | --- | --- | --- |
| D0 | ∞ | 226.746 | 138.188 |
| D7 | 3.662 | 12.980 | 22.619 |
| D12 | 25.484 | 16.167 | 6.528 |
| D13 | 24.986 | 14.031 | 4.245 |
| D18 | 2.206 | 13.161 | 22.947 |
| FNO | 2.89 | 3.68 | 4.65 |

TABLE 1-continued

| [Lens Group Data] | | |
|---|---|---|
| Group | First surface | Focal length |
| G1 | 1 | 56.05 |
| G2 | 8 | −49.08 |
| G3 | 14 | 52.89 |
| G4 | 19 | −64.87 |

Figure 2A:
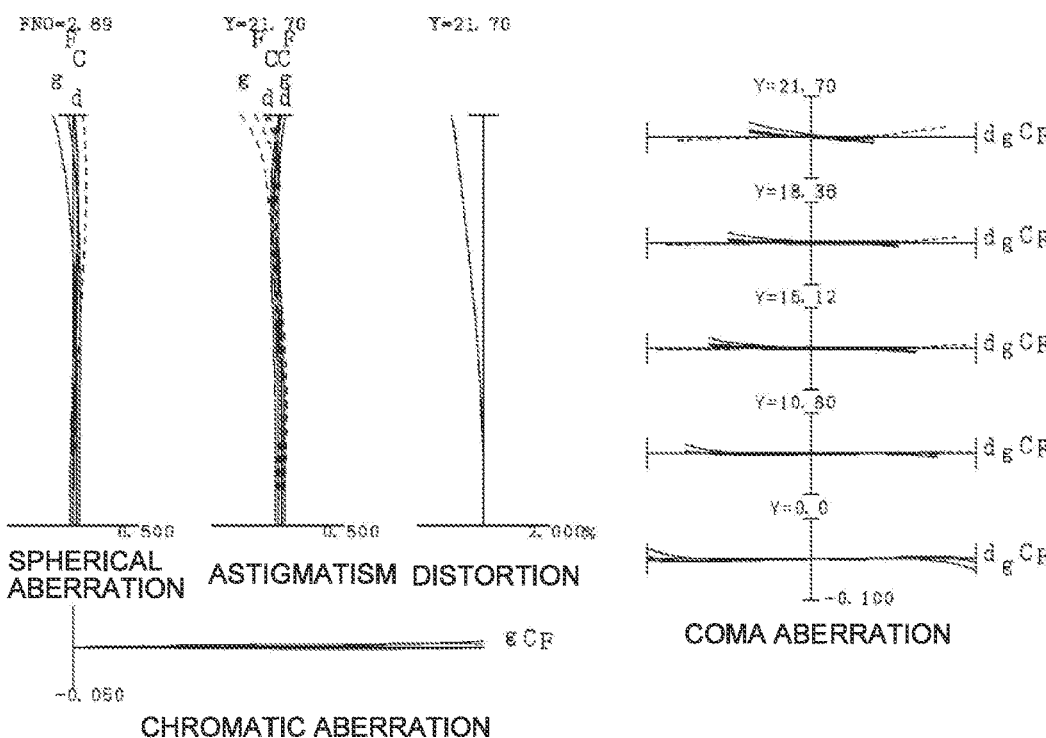
FIGS. 2A and 2B are various aberration graphs of the optical system according to First Example upon focusing on infinity and upon focusing on a shortest-distance object, respectively.
Figure 2B:
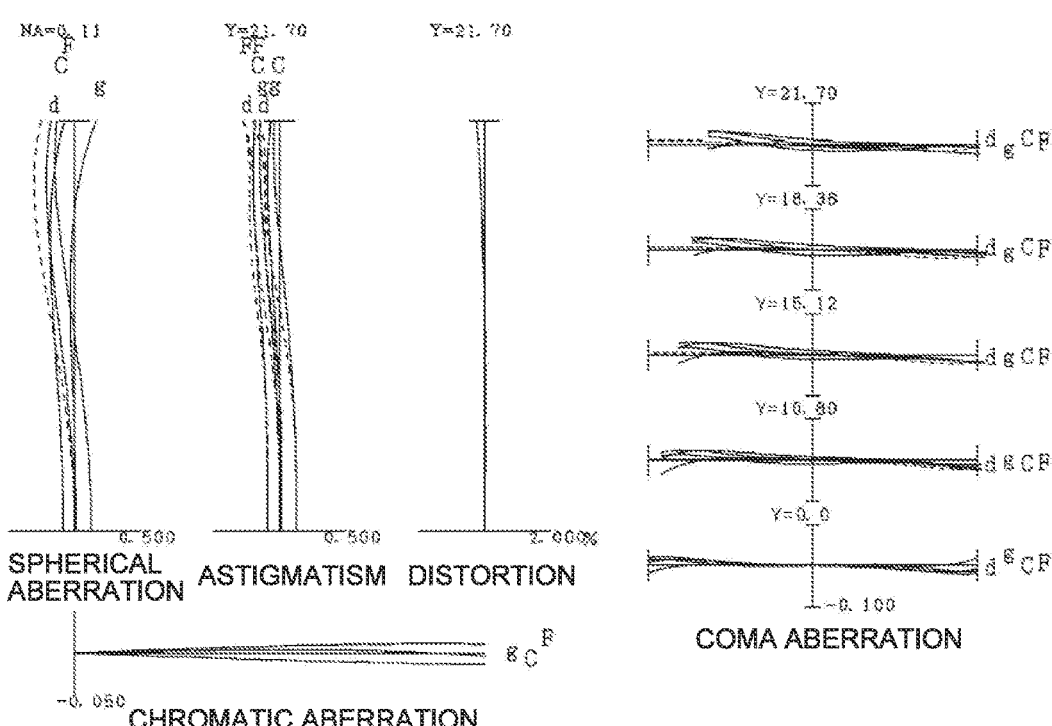

FIG. 2A shows various aberration graphs of the optical system upon focusing on infinity according to First Example. FIG. 2B shows various aberration graphs of the optical system upon focusing on a shortest-distance object (photographing magnification $\beta=-1.0$) according to First Example. In each aberration graph upon focusing on infinity, FNO indicates the f-number, and Y indicates the image height. In each aberration graph upon focusing on the shortest-distance object, NA indicates the numerical aperture, and Y indicates the image height. Note that the spherical aberration graph indicates the value of the f-number or the numerical aperture that corresponds to the maximum aperture. The astigmatism graph and the distortion graph each indicate the maximum value of the image height. The coma aberration graph indicates the value of the corresponding image height. d indicates d-line (wavelength $\lambda=587.6$ nm), g indicates g-line (wavelength $\lambda=435.8$ nm), C indicates C-line (wavelength $\lambda=656.3$ nm), and F indicates F-line (wavelength $\lambda=486.1$ nm). In the astigmatism graph, a solid line indicates a sagittal image surface, and a broken line indicates a meridional image surface. Note that also in the aberration graphs in the following Examples, symbols similar to those in this Example are used, and redundant description is omitted.

The various aberration graphs show that in the optical system according to First Example, over the entire range from focusing on infinity to focusing on the shortest-distance object, the various aberrations are favorably corrected, and an excellent imaging performance is achieved.

Second Example

Figure 3:
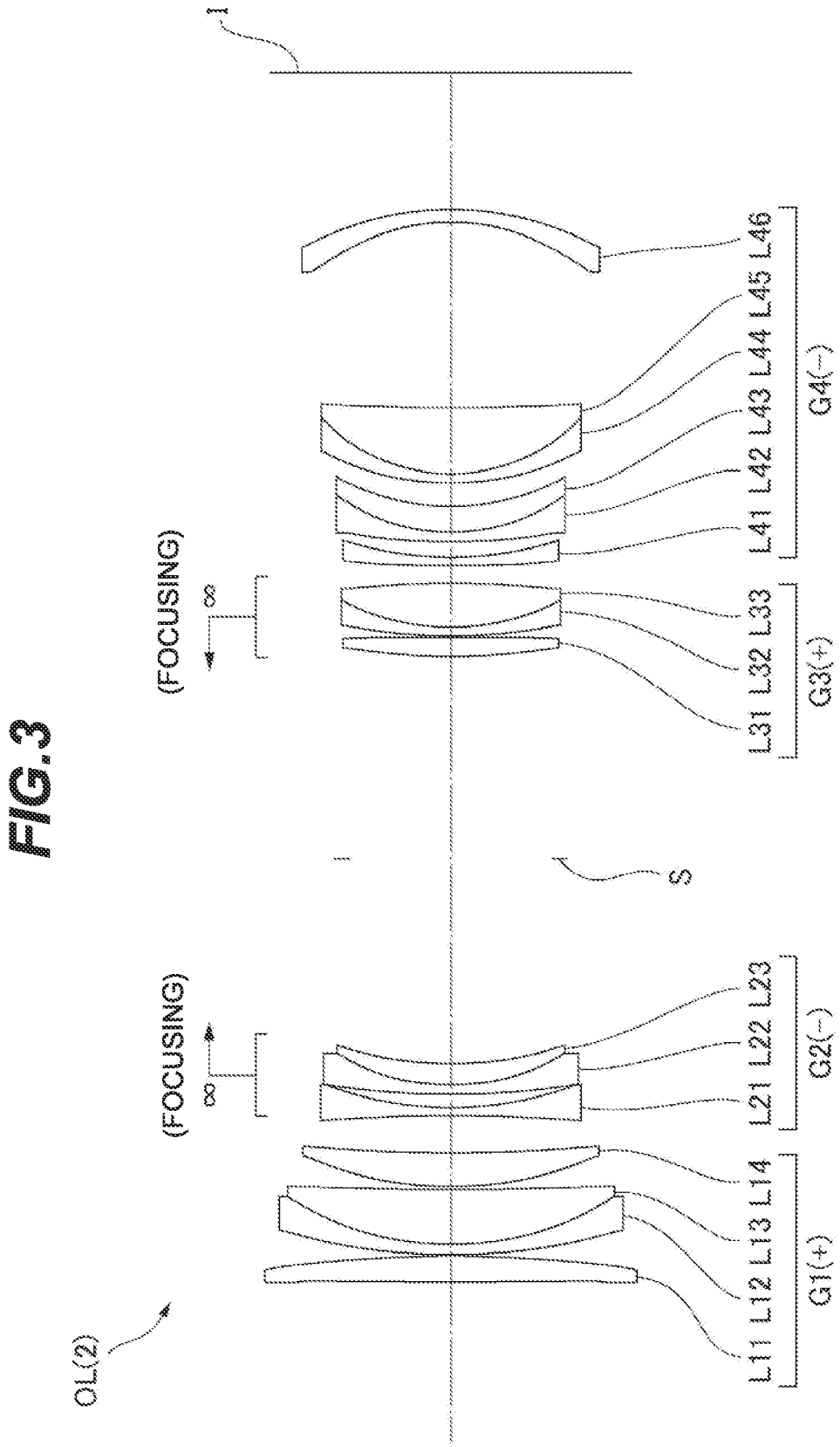
FIG. 3 shows a lens configuration of an optical system according to Second Example.

Second Example is described with reference to FIGS. 3 and 4A and 4B and Table 2. FIG. 3 shows a lens configuration of an optical system according to Second Example. The optical system OL(2) according to Second Example comprises, in order from an object on the optical axis, a first lens group G1 having a positive refractive power, a second lens group G2 having a negative refractive power, a third lens group G3 having a positive refractive power, and a fourth lens group G4 having a negative refractive power. During focusing from the infinity object to the short-distance object, the second lens group G2 moves toward the image on the optical axis, the third lens group G3 moves toward the object on the optical axis, and the distances between the lens groups adjacent to each other change. Note that, during focusing, the positions of the first lens group G1 and the fourth lens group G4 are fixed with respect to the image surface I. The aperture stop S is disposed between the second lens group G2 and the third lens group G3. During focusing, the position of the aperture stop S is fixed with respect to the image surface I.

In Second Example, the second lens group G2, the third lens group G3 and the fourth lens group G4 each have a configuration similar to that of First Example. Accordingly, the same symbols as those in the case of First Example are assigned, and detailed description of the lenses is omitted. The first lens group G1 comprises, in order from the object on the optical axis, a positive meniscus lens L11 having a concave surface facing the object, a cemented lens including a negative meniscus lens L12 having a convex surface facing the object and a positive meniscus lens L13 having a convex surface facing the object which are cemented to each other, and a positive meniscus lens L14 having a convex surface facing the object. In this Example, the negative meniscus lens L12 of the first lens group G1 corresponds to the negative lens in which the conditional expressions (4) to (6) are satisfied. The negative meniscus lens L32 of the third lens group G3 corresponds to the negative lens in which the conditional expressions (17) to (19) are satisfied.

The following Table 2 lists values of data on the optical system according to Second Example.

TABLE 2

| [General Data] | | | | | |
|---|---|---|---|---|---|
| f = 102.90 | | | $\beta2$ = 8.644 | | |
| $2\omega$ = 24.05 | | | $\beta3$ = 0.140 | | |
| Ymax = 21.70 | | | Mf2 = 18.759 | | |
| TL = 149.44 | | | Mf3 = 20.918 | | |
| Bf = 16.84 | | | | | |

| [Lens Data] | | | | | |
|---|---|---|---|---|---|
| Surface Number | R | D | nd | vd | θgF |
| Object Surface | ∞ | (D0) | | | |
| 1 | −970.6344 | 3.130 | 1.83481 | 42.73 | |
| 2 | −155.1786 | 0.200 | | | |
| 3 | 81.0511 | 1.200 | 1.85451 | 25.15 | 0.6103 |
| 4 | 39.5973 | 6.920 | 1.59319 | 67.90 | |
| 5 | 1859.7639 | 0.200 | | | |
| 6 | 47.279 | 4.100 | 1.59319 | 67.90 | |
| 7 | 216.5762 | (D7) | | | |
| 8 | −224.7372 | 1.100 | 1.51860 | 69.89 | |
| 9 | 47.2726 | 1.597 | | | |
| 10 | 121.819 | 1.100 | 1.72047 | 34.71 | |
| 11 | 29.0024 | 2.610 | 1.94595 | 17.98 | |
| 12 | 45.9042 | (D12) | | | |
| 13 | ∞ | (D13) | | | (Aperture Stop S) |
| 14 | 78.5700 | 2.400 | 1.83481 | 42.73 | |
| 15 | −637.4162 | 0.200 | | | |
| 16 | 79.2597 | 1.100 | 1.85451 | 25.15 | 0.6103 |
| 17 | 32.0633 | 5.300 | 1.59319 | 67.90 | |
| 18 | −121.6144 | (D18) | | | |
| 19 | 152.5421 | 1.100 | 1.95375 | 32.33 | |
| 20 | 46.0324 | 2.000 | | | |
| 21 | 95.1769 | 1.100 | 1.51860 | 69.89 | |
| 22 | 24.2848 | 3.200 | 1.94595 | 17.98 | |
| 23 | 29.7026 | 3.000 | | | |
| 24 | 36.4143 | 1.100 | 2.00069 | 25.46 | |
| 25 | 22.7290 | 8.210 | 1.80440 | 39.61 | |
| 26 | 309.1328 | 22.990 | | | |
| 27* | −23.6207 | 1.500 | 1.51680 | 64.14 | |
| 28 | −38.5736 | Bf | | | |
| Image Surface | ∞ | | | | |

| [Aspherical Surface Data] |
|---|
| 27th Surface |
| κ = 1.000, A4 = 1.19399E−05, A6 = 2.04728E−08 A8 = −7.55581E−11, A10 = 2.43965E−13, A12 = −1.86360E−16 |

21

TABLE 2-continued

[Variable Distance Data]

| | Upon focusing on infinity f = 102.90 | Upon focusing on an intermediate distance object β = −0.5 | upon focusing on a shortest-distance object β = −1.0 |
|---|---|---|---|
| D0 | ∞ | 226.763 | 138.555 |
| D7 | 4.600 | 13.875 | 23.358 |
| D12 | 25.347 | 16.072 | 6.588 |
| D13 | 25.096 | 14.117 | 4.178 |
| D18 | 2.200 | 13.179 | 23.118 |
| FNO | 2.91 | 3.68 | 4.79 |

[Lens Group Data]

| Group | First surface | Focal length |
|---|---|---|
| G1 | 1 | 56.46 |
| G2 | 8 | −48.99 |
| G3 | 14 | 52.33 |
| G4 | 19 | −65.47 |

Figure 4A:
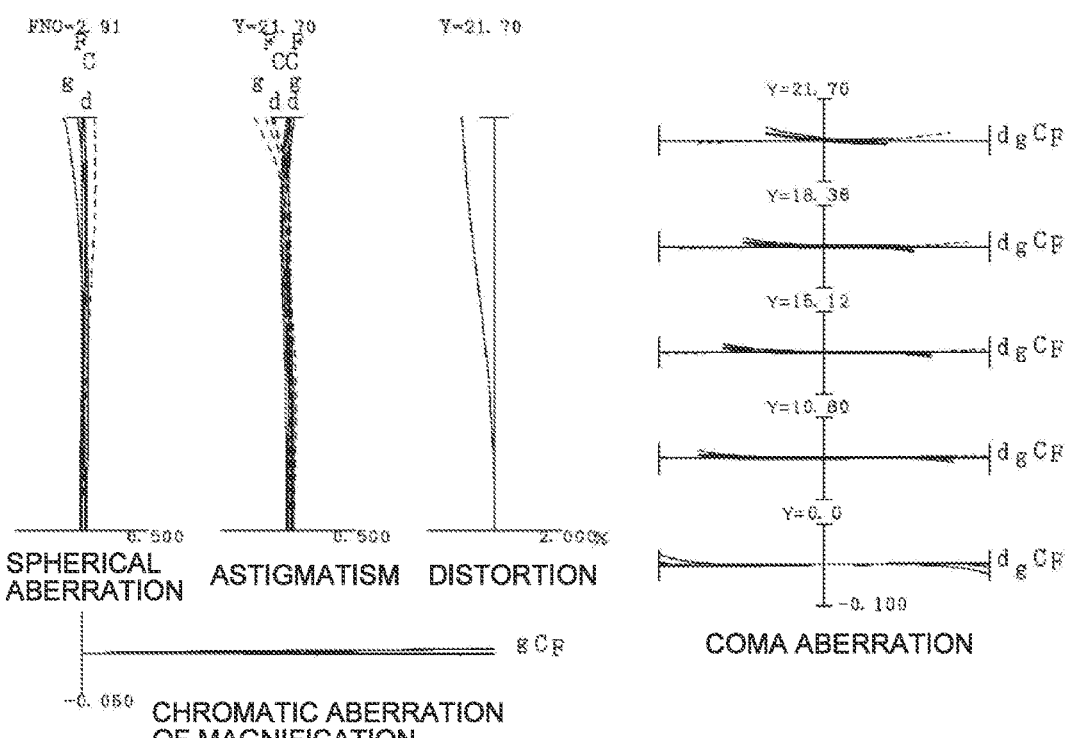
FIGS. 4A and 4B are various aberration graphs of the optical system according to Second Example upon focusing on infinity and upon focusing on a shortest-distance object, respectively.
Figure 4B:
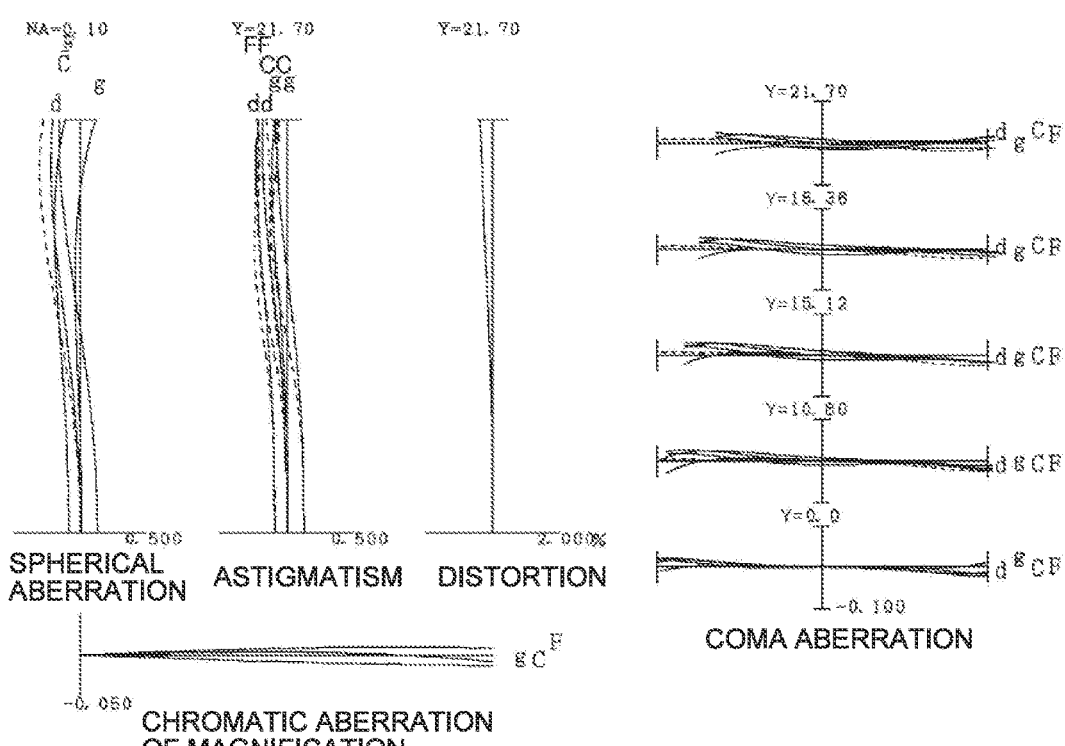

FIG. 4A shows various aberration graphs of the optical system upon focusing on infinity according to Second Example. FIG. 4B shows various aberration graphs of the optical system upon focusing on a shortest-distance object (photographing magnification β=−1.0) according to Second Example. The various aberration graphs show that in the optical system according to Second Example, over the entire range from focusing on infinity to focusing on the shortest-distance object, the various aberrations are favorably corrected, and an excellent imaging performance is achieved.

Third Example

Third Example is described with reference to FIGS. 5 and 6A and 6B and Table 3. FIG. 5 shows a lens configuration of an optical system according to Third Example. The optical system OL(3) according to Third Example comprises, in order from an object on the optical axis, a first lens group G1 having a positive refractive power, a second lens group G2 having a negative refractive power, a third lens group G3 having a positive refractive power, and a fourth lens group G4 having a negative refractive power. During focusing from the infinity object to the short-distance object, the second lens group G2 moves toward the image on the optical axis, the third lens group G3 moves toward the object on the optical axis, and the distances between the lens groups adjacent to each other change. Note that, during focusing, the positions of the first lens group G1 and the fourth lens group G4 are fixed with respect to the image surface I. The aperture stop S is disposed between the second lens group G2 and the third lens group G3. During focusing, the position of the aperture stop S is fixed with respect to the image surface I.

In Third Example, the second lens group G2, the third lens group G3 and the fourth lens group G4 each have a configuration similar to that of First Example. Accordingly, the same symbols as those in the case of First Example are assigned, and detailed description of the lenses is omitted. The first lens group G1 comprises, in order from the object on the optical axis, a biconvex positive lens L11, a cemented lens including a negative meniscus lens L12 having a convex surface facing the object and a positive meniscus lens L13 having a convex surface facing the object which are cemented to each other, and a positive meniscus lens L14 having a convex surface facing the object. The positive meniscus lens L14 includes an object-side lens surface that is an aspherical surface. In this Example, the negative meniscus lens L12 of the first lens group G1 corresponds to the negative lens in which the conditional expressions (4) to (6) are satisfied. The negative meniscus lens L32 of the third lens group G3 corresponds to the negative lens in which conditional expressions (17) to (19) are satisfied.

The following Table 3 lists values of data on the optical system according to Third Example.

TABLE 3

[General Data]

| | |
|---|---|
| f = 112.70 | β2 = 6.996 |
| 2ω = 21.80 | β3 = 0.187 |
| Ymax = 21.70 | Mf2 = 18.085 |
| TL = 153.44 | Mf3 = 20.338 |
| Bf = 18.23 | |

[Lens Data]

| Surface Number | R | D | nd | νd | θgF |
|---|---|---|---|---|---|
| Object Surface | ∞ | (D0) | | | |
| 1 | 355.1676 | 3.588 | 1.83327 | 42.78 | |
| 2 | −285.0651 | 4.067 | | | |
| 3 | 69.2281 | 2.242 | 1.85451 | 25.15 | 0.6103 |
| 4 | 35.8609 | 7.035 | 1.59319 | 67.90 | |
| 5 | 290.9476 | 0.200 | | | |
| 6* | 51.7012 | 5.811 | 1.59319 | 67.90 | |
| 7 | 490.4661 | (D7) | | | |
| 8 | −343.8397 | 1.159 | 1.51860 | 69.89 | |
| 9 | 43.0965 | 5.534 | | | |
| 10 | 235.9802 | 1.189 | 1.72047 | 34.71 | |
| 11 | 32.9473 | 2.618 | 1.94594 | 17.98 | |
| 12 | 56.6601 | (D12) | | | |
| 13 | ∞ | (D13) | | | (Aperture Stop S) |
| 14 | 126.3547 | 2.400 | 1.83369 | 42.76 | |
| 15 | −603.5933 | 0.220 | | | |
| 16 | 69.9801 | 1.100 | 1.85451 | 25.15 | 0.6103 |
| 17 | 34.3310 | 5.800 | 1.59319 | 67.90 | |
| 18 | −90.9674 | (D18) | | | |
| 19 | 219.3497 | 1.198 | 1.94180 | 30.88 | |
| 20 | 48.5362 | 2.000 | | | |
| 21 | 113.6761 | 1.200 | 1.51860 | 69.89 | |
| 22 | 26.146 | 3.256 | 1.94594 | 17.98 | |
| 23 | 34.4512 | 3.000 | | | |
| 24 | 38.6884 | 1.100 | 2.00069 | 25.46 | |
| 25 | 23.5045 | 7.441 | 1.80610 | 40.97 | |
| 26 | 293.6016 | 19.200 | | | |
| 27* | −20.7242 | 2.129 | 1.51680 | 64.13 | |
| 28 | −33.3932 | Bf | | | |
| Image Surface | ∞ | | | | |

[Aspherical Surface Data]

6th Surface

κ = 1.000, A4 = −7.80076E−08, A6 = 7.83037E−11
A8 = −1.44363E−13, A10 = 0.00000E+00, A12 = 0.00000E+00

27th Surface

κ = 1.000, A4 = 1.27301E−05, A6 = 1.49611E−08
A8 = 9.59928E−12, A10 = −4.03456E−15, A12 = 3.26570E−16

[Variable Distance Data]

| | Upon focusing on infinity f = 112.70 | Upon focusing on an intermediate distance object β = −0.5 | Upon focusing on a shortest-distance object β = −1.0 |
|---|---|---|---|
| D0 | ∞ | 241.112 | 143.316 |
| D7 | 2.233 | 10.886 | 20.318 |
| D12 | 23.545 | 14.893 | 5.461 |
| D13 | 22.608 | 11.511 | 2.270 |

TABLE 3-continued

| D18 | 3.338 | 14.435 | 23.676 |
|-----|-------|--------|--------|
| FNO | 2.92 | 3.71 | 4.73 |

[Lens Group Data]

| Group | First surface | Focal length |
|-------|---------------|--------------|
| G1 | 1 | 55.98 |
| G2 | 8 | −47.61 |
| G3 | 14 | 53.52 |
| G4 | 19 | −46.34 |

Figure 6A:
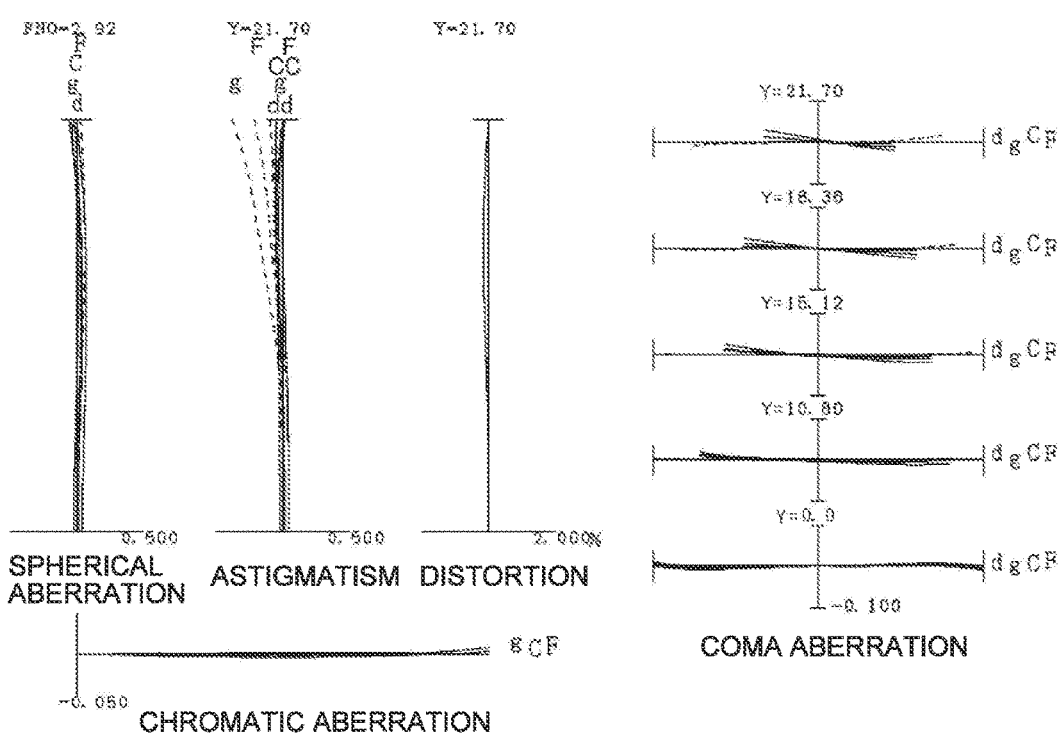
FIGS. 6A and 6B are various aberration graphs of the optical system according to Third Example upon focusing on infinity and upon focusing on a shortest-distance object, respectively.
Figure 6B:
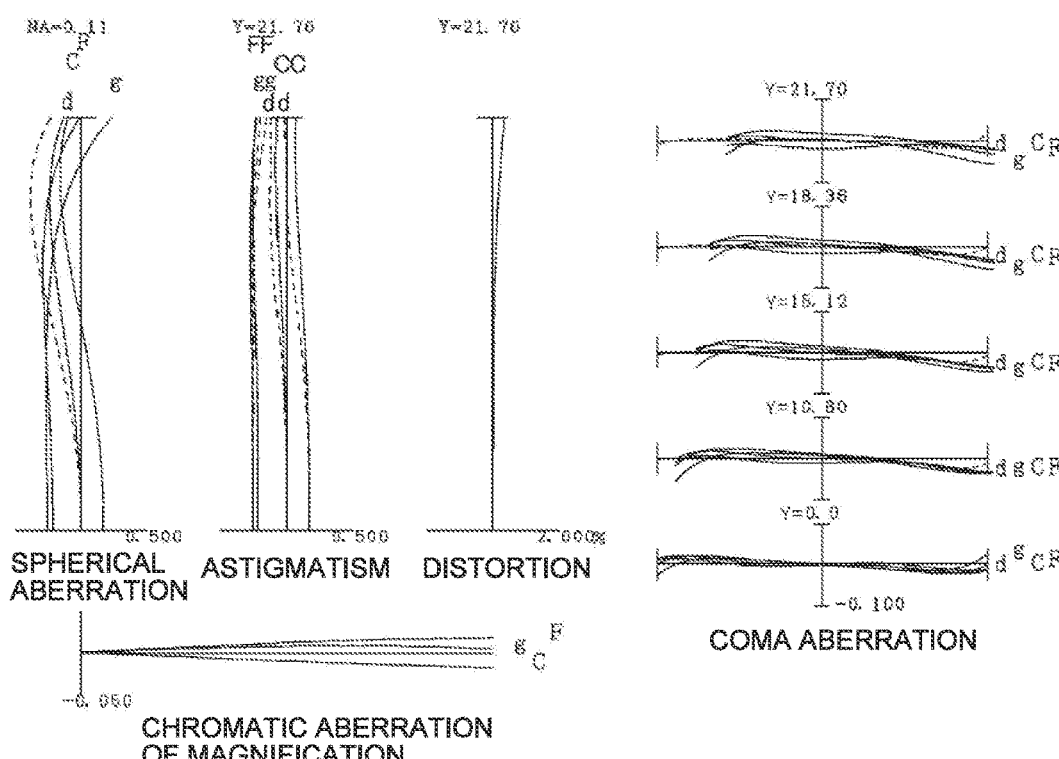

FIG. 6A shows various aberration graphs of the optical system upon focusing on infinity according to Third Example. FIG. 6B shows various aberration graphs of the optical system upon focusing on a shortest-distance object (photographing magnification β=−1.0) according to Third Example. The various aberration graphs show that in the optical system according to Third Example, over the entire range from focusing on infinity to focusing on the shortest-distance object, the various aberrations are favorably corrected, and an excellent imaging performance is achieved.

Fourth Example

Fourth Example is described with reference to FIGS. 7 and FIGS. 8A and 8B and Table 4. FIG. 7 shows a lens configuration of an optical system according to Fourth Example. The optical system OL(4) according to Fourth Example comprises, in order from an object on the optical axis, a first lens group G1 having a positive refractive power, a second lens group G2 having a negative refractive power, a third lens group G3 having a positive refractive power, and a fourth lens group G4 having a negative refractive power. During focusing from the infinity object to the short-distance object, the second lens group G2 moves toward the image on the optical axis, the third lens group G3 moves toward the object on the optical axis, and the distances between the lens groups adjacent to each other change. Note that, during focusing, the positions of the first lens group G1 and the fourth lens group G4 are fixed with respect to the image surface I. The aperture stop S is disposed between the second lens group G2 and the third lens group G3. During focusing, the position of the aperture stop S is fixed with respect to the image surface I.

In Fourth Example, the second lens group G2 and the third lens group G3 each have a configuration similar to that of First Example. Accordingly, the same symbols as those in the case of First Example are assigned, and detailed description of the lenses is omitted. The first lens group G1 comprises, in order from the object on the optical axis, a biconvex positive lens L11, a cemented lens including a negative meniscus lens L12 having a convex surface facing the object and a biconvex positive lens L13 which are cemented to each other, and a positive meniscus lens L14 having a convex surface facing the object. The positive meniscus lens L14 includes an object-side lens surface that is an aspherical surface. In this Example, the negative meniscus lens L12 of the first lens group G1 corresponds to the negative lens in which the conditional expressions (4) to (6) are satisfied. The negative meniscus lens L32 of the third lens group G3 corresponds to the negative lens in which the conditional expressions (17) to (19) are satisfied.

The fourth lens group G4 comprises, in order from the object on the optical axis, a biconcave negative lens L41, a cemented lens including a negative meniscus lens L42 having a convex surface facing the object and a positive meniscus lens L43 having a convex surface facing the object which are cemented to each other, a cemented lens including a negative meniscus lens L44 having a convex surface facing the object and a biconvex positive lens L45 which are cemented to each other, and a negative meniscus lens L46 having a concave surface facing the object. The negative meniscus lens L46 includes an object-side lens surface that is an aspherical surface. The image surface I is disposed on the image side of the fourth lens group G4.

The following Table 4 lists values of data on the optical system according to Fourth Example.

TABLE 4

[General Data]

| | |
|---|---|
| f = 91.80 | β2 = 9.291 |
| 2ω = 26.86 | β3 = 0.129 |
| Ymax = 21.70 | Mf2 = 18.681 |
| TL = 144.30 | Mf3 = 22.112 |
| Bf = 13.94 | |

[Lens Data]

| Surface Number | R | D | nd | νd | θgF |
|----------------|------|------|------|------|------|
| Object Surface | ∞ | (D0) | | | |
| 1 | 408.2969 | 3.380 | 1.83481 | 42.73 | |
| 2 | −272.198 | 0.200 | | | |
| 3 | 88.8401 | 1.200 | 1.85451 | 25.15 | 0.6103 |
| 4 | 40.6806 | 7.283 | 1.59319 | 67.90 | |
| 5 | −2294.7045 | 0.200 | | | |
| 6* | 44.6204 | 4.666 | 1.59319 | 67.90 | |
| 7 | 181.6868 | (D7) | | | |
| 8 | −474.3707 | 1.100 | 1.51860 | 69.89 | |
| 9 | 37.2782 | 2.943 | | | |
| 10 | 257.8909 | 1.100 | 1.72047 | 34.71 | |
| 11 | 35.7865 | 2.739 | 1.94594 | 17.98 | |
| 12 | 67.2338 | (D12) | | | |
| 13 | ∞ | (D13) | | | (Aperture Stop S) |
| 14 | 80.2960 | 2.599 | 1.85225 | 41.93 | |
| 15 | −261.2143 | 0.200 | | | |
| 16 | 103.5562 | 1.127 | 1.85451 | 25.15 | 0.6103 |
| 17 | 33.2058 | 5.480 | 1.59319 | 67.90 | |
| 18 | −115.1949 | (D18) | | | |
| 19 | −489.7555 | 1.182 | 1.90412 | 28.78 | |
| 20 | 84.0357 | 2.000 | | | |
| 21 | 1584.8325 | 1.100 | 1.51860 | 69.89 | |
| 22 | 30.4557 | 3.319 | 1.94594 | 17.98 | |
| 23 | 42.4678 | 3.000 | | | |
| 24 | 50.1735 | 1.100 | 2.00069 | 25.46 | |
| 25 | 29.4301 | 7.673 | 1.81892 | 43.48 | |
| 26 | −234.4595 | 24.209 | | | |
| 27* | −20.3038 | 1.500 | 1.51680 | 64.13 | |
| 28 | −38.3517 | Bf | | | |
| Image Surface | ∞ | | | | |

[Aspherical Surface Data]

6th Surface

κ = 1.000, A4 = −1.39939E−07, A6 = −9.81797E−11
A8 = −3.74424E−13, A10 = 1.22198E−15, A12 = −1.93260E−18

27th Surface

κ = 1.000, A4 = 1.58902E−05, A6 = 1.67973E−08
A8 = 2.63185E−11, A10 = −9.61351E−14, A12 = 5.69420E−16

TABLE 4-continued

[Variable Distance Data]

|  | Upon focusing on infinity f = 91.80 | Upon focusing on an intermediate distance object β = −0.5 | Upon focusing on a shortest-distance object β = −1.0 |
|---|---|---|---|
| D0 | ∞ | 207.102 | 129.576 |
| D7 | 2.004 | 11.344 | 20.685 |
| D12 | 22.744 | 13.404 | 4.064 |
| D13 | 23.943 | 12.265 | 1.831 |
| D18 | 2.371 | 14.048 | 24.482 |
| FNO | 2.85 | 3.66 | 4.83 |

[Lens Group Data]

| Group | First surface | Focal length |
|---|---|---|
| G1 | 1 | 55.98 |
| G2 | 8 | −47.61 |
| G3 | 14 | 53.52 |
| G4 | 19 | −46.34 |

Figure 8A:
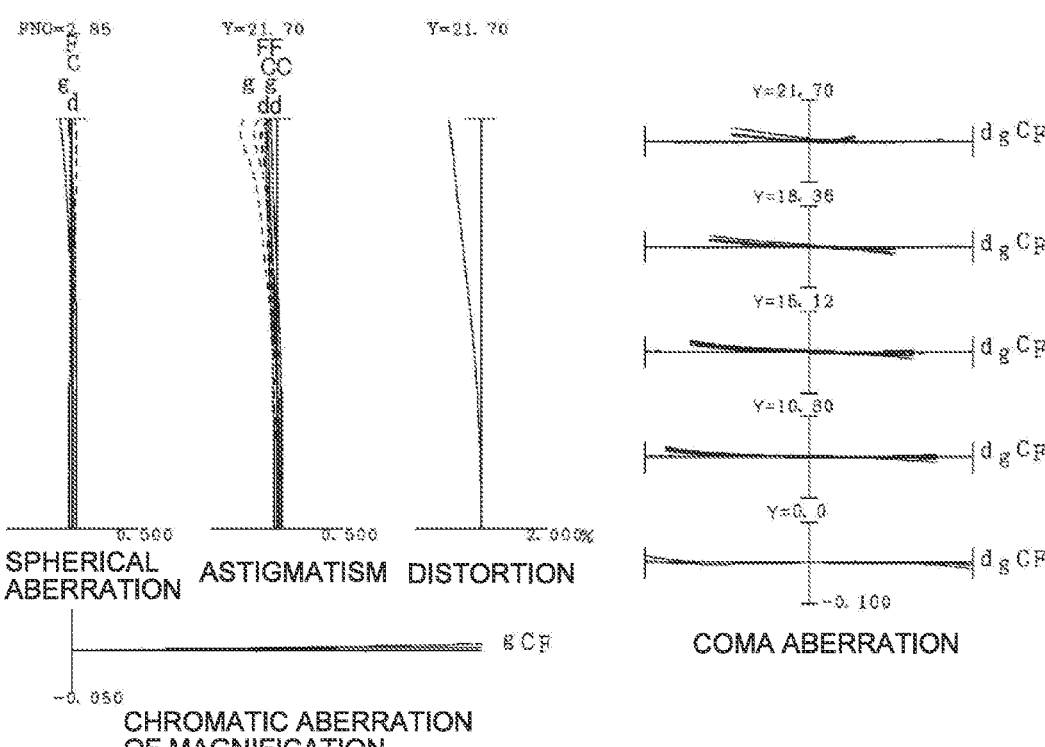
FIGS. 8A and 8B are various aberration graphs of the optical system according to Fourth Example upon focusing on infinity and upon focusing on a shortest-distance object, respectively.
Figure 8B:
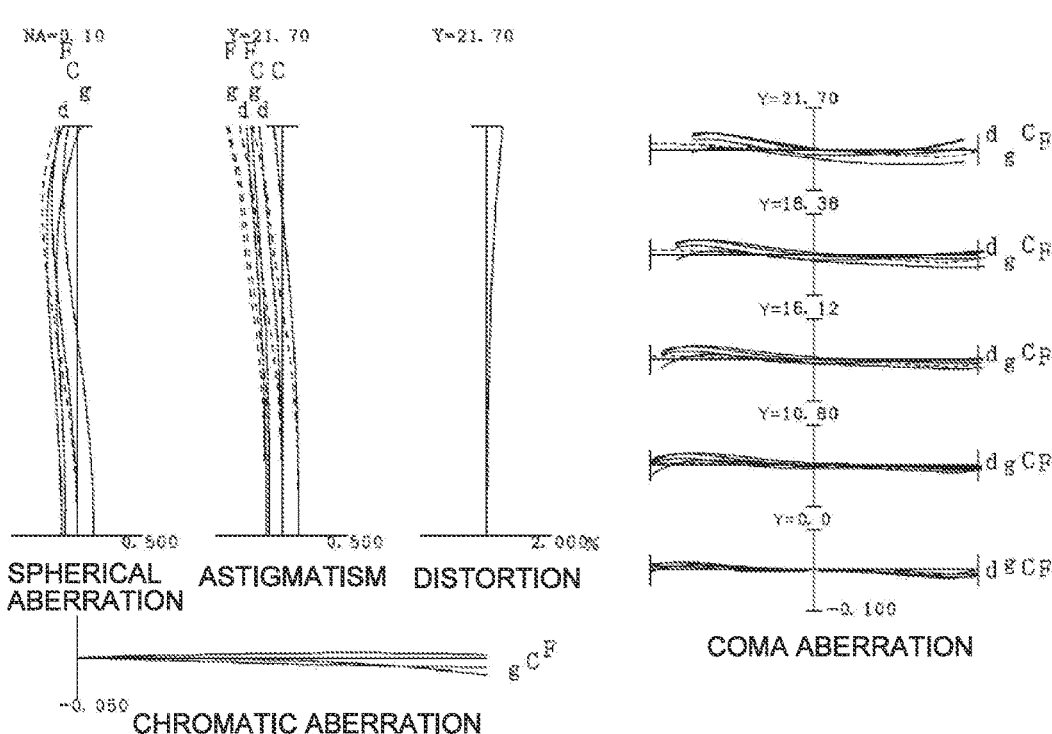

FIG. 8A shows various aberration graphs of the optical system upon focusing on infinity according to Fourth Example. FIG. 8B shows various aberration graphs of the optical system upon focusing on a shortest-distance object (photographing magnification β=−1.0) according to Fourth Example. The various aberration graphs show that in the optical system according to Fourth Example, over the entire range from focusing on infinity to focusing on the shortest-distance object, the various aberrations are favorably corrected, and an excellent imaging performance is achieved.

Fifth Example

Fifth Example is described with reference to FIGS. 9 and FIGS. 10A and 10B and Table 5. FIG. 9 shows a lens configuration of an optical system according to Fifth Example. The optical system OL(5) according to Fifth Example comprises, in order from an object on the optical axis, a first lens group G1 having a positive refractive power, a second lens group G2 having a negative refractive power, a third lens group G3 having a positive refractive power, and a fourth lens group G4 having a negative refractive power. During focusing from the infinity object to the short-distance object, the second lens group G2 moves toward the image on the optical axis, the third lens group G3 moves toward the object on the optical axis, and the distances between the lens groups adjacent to each other change. Note that, during focusing, the positions of the first lens group G1 and the fourth lens group G4 are fixed with respect to the image surface I. The aperture stop S is disposed between the second lens group G2 and the third lens group G3. During focusing, the position of the aperture stop S is fixed with respect to the image surface I.

In Fifth Example, the second lens group G2 and the third lens group G3 each have a configuration similar to that of First Example. Accordingly, the same symbols as those in the case of First Example are assigned, and detailed description of the lenses is omitted. The first lens group G1 comprises, in order from the object on the optical axis, a biconvex positive lens L11, a cemented lens including a negative meniscus lens L12 having a convex surface facing the object and a biconvex positive lens L13 which are cemented to each other, and a positive meniscus lens L14 having a convex surface facing the object. In this Example, the negative meniscus lens L12 of the first lens group G1 corresponds to the negative lens in which the conditional expressions (4) to (6) are satisfied. The negative meniscus lens L32 of the third lens group G3 corresponds to the negative lens in which the conditional expressions (17) to (19) are satisfied.

The fourth lens group G4 comprises, in order from the object on the optical axis, a negative meniscus lens L41 having a convex surface facing the object, a cemented lens including a negative meniscus lens L42 having a convex surface facing the object and a positive meniscus lens L43 having a convex surface facing the object which are cemented to each other, a positive meniscus lens L44 having a convex surface facing the object, a cemented lens including a negative meniscus lens L45 having a convex surface facing the object and a biconvex positive lens L46 which are cemented to each other, and a negative meniscus lens L47 having a concave surface facing the object. The negative meniscus lens L47 includes an object-side lens surface that is an aspherical surface. The image surface I is disposed on the image side of the fourth lens group G4.

The following Table 5 lists values of data on the optical system according to Fifth Example.

TABLE 5

[General Data]

| | |
|---|---|
| f = 102.90 | β2 = 7.191 |
| 2ω = 24.02 | β3 = 0.167 |
| Ymax = 21.70 | Mf2 = 17.513 |
| TL = 151.46 | Mf3 = 18.500 |
| Bf = 16.67 | |

[Lens Data]

| Surface Number | R | D | nd | vd | θgF |
|---|---|---|---|---|---|
| Object Surface | ∞ | (D0) | | | |
| 1 | 281.4565 | 4.042 | 1.84850 | 43.79 | |
| 2 | −254.6508 | 2.526 | | | |
| 3 | 114.5240 | 1.200 | 1.85451 | 25.15 | 0.6103 |
| 4 | 40.7834 | 7.528 | 1.59319 | 67.90 | |
| 5 | −338.1593 | 0.200 | | | |
| 6 | 42.8169 | 3.939 | 1.59319 | 67.90 | |
| 7 | 155.8083 | (D7) | | | |
| 8 | −223.9031 | 1.223 | 1.51860 | 69.89 | |
| 9 | 42.8160 | 2.098 | | | |
| 10 | 151.8246 | 1.200 | 1.74950 | 35.25 | |
| 11 | 30.8506 | 3.790 | 1.94594 | 17.98 | |
| 12 | 53.8828 | (D12) | | | |
| 13 | ∞ | (D13) | | | (Aperture Stop S) |
| 14 | 108.3408 | 3.055 | 1.84850 | 43.79 | |
| 15 | −203.4420 | 0.200 | | | |
| 16 | 67.4695 | 1.200 | 1.85451 | 25.15 | 0.6103 |
| 17 | 31.8859 | 6.500 | 1.59319 | 67.90 | |
| 18 | −140.2381 | (D18) | | | |
| 19 | 216.9695 | 1.200 | 1.89190 | 37.13 | |
| 20 | 33.9171 | 3.218 | | | |
| 21 | 126.0145 | 1.200 | 1.59349 | 67.00 | |
| 22 | 27.2774 | 3.571 | 1.94594 | 17.98 | |
| 23 | 40.9231 | 2.000 | | | |
| 24 | 35.5779 | 5.995 | 1.83481 | 42.73 | |
| 25 | 166.9394 | 1.000 | | | |
| 26 | 117.0398 | 2.000 | 1.90200 | 25.26 | |
| 27 | 22.6500 | 10.000 | 1.76200 | 40.11 | |
| 28 | −2467.5977 | 14.472 | | | |
| 29* | −19.9041 | 1.200 | 1.51680 | 64.13 | |
| 30 | −33.7790 | Bf | | | |
| Image Surface | ∞ | | | | |

TABLE 5-continued

[Aspherical Surface Data]

29th Surface $\kappa = 1.000$, A4 = 1.95940E−05, A6 = −1.65107E−08
A8 = 2.48794E−10, A10 = −8.47293E−13, A12 = 1.57410E−15

[Variable Distance Data]

|  | Upon focusing on infinity f = 102.90 | Upon focusing on an intermediate distance object $\beta = -0.5$ | Upon focusing on a shortest-distance object $\beta = -1.0$ |
|---|---|---|---|
| D0 | ∞ | 226.207 | 135.900 |
| D7 | 3.000 | 11.595 | 20.513 |
| D12 | 23.577 | 14.982 | 6.064 |
| D13 | 21.246 | 11.581 | 2.746 |
| D18 | 2.000 | 11.666 | 20.500 |
| FNO | 2.85 | 3.65 | 4.73 |

[Lens Group Data]

| Group | First surface | Focal length |
|---|---|---|
| G1 | 1 | 53.71 |
| G2 | 8 | −47.46 |
| G3 | 14 | 49.28 |
| G4 | 19 | −35.41 |

Figure 10A:
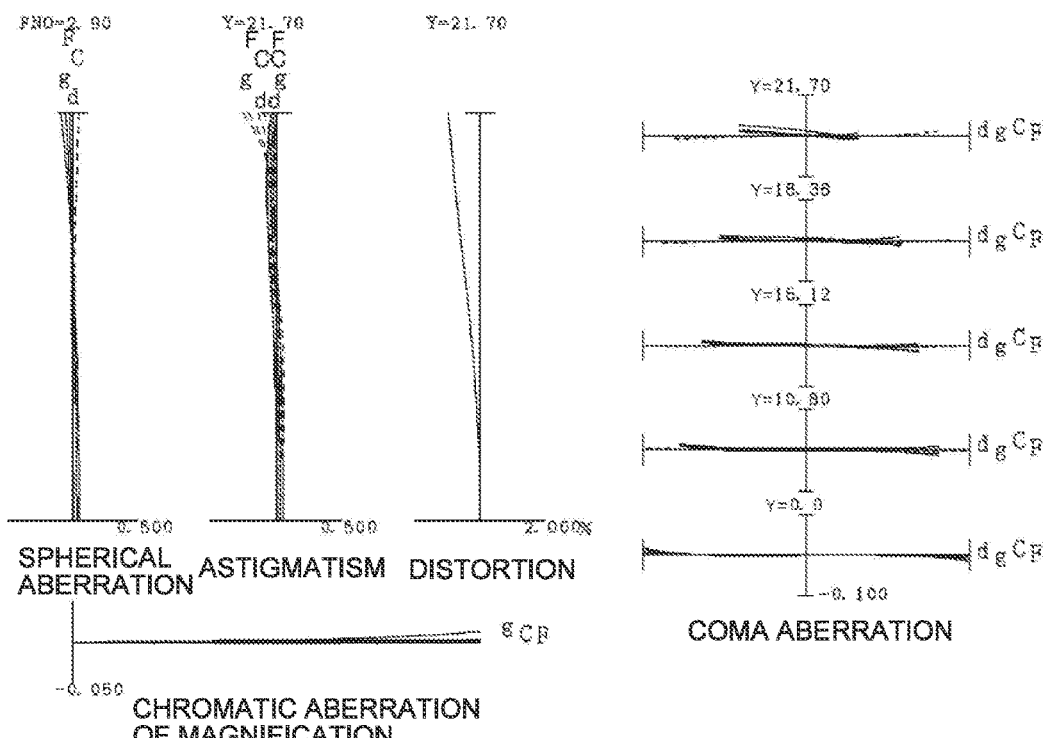
FIGS. 10A and 10B are various aberration graphs of the optical system according to Fifth Example upon focusing on infinity and upon focusing on a shortest-distance object, respectively.
Figure 10B:
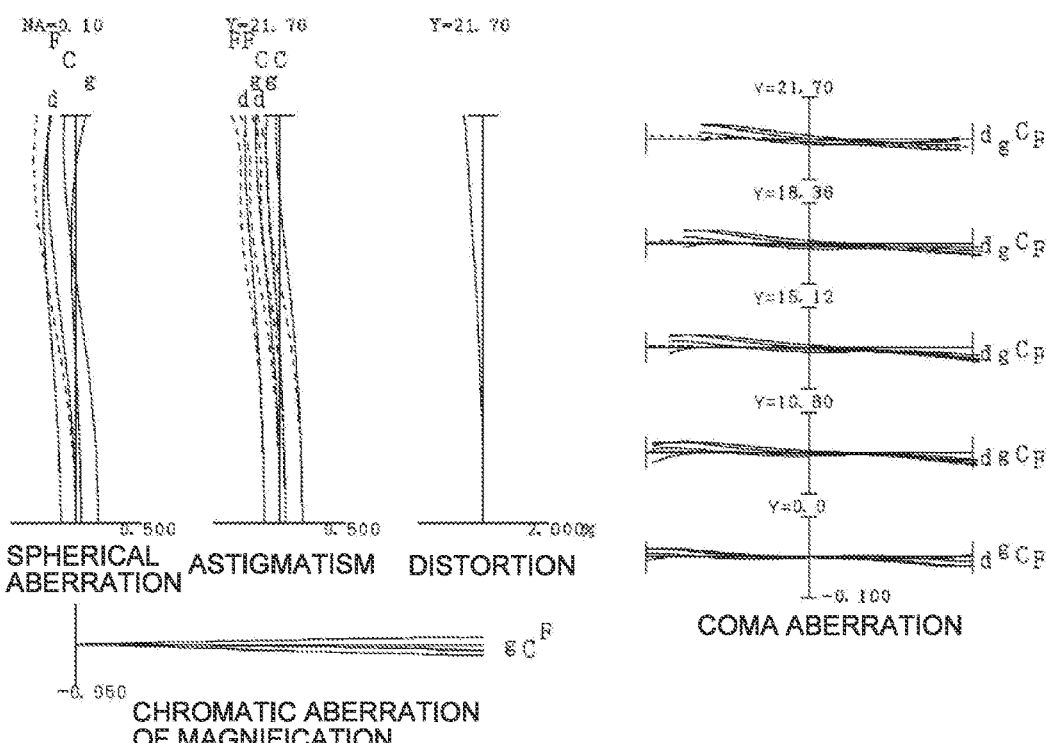

FIG. 10A shows various aberration graphs of the optical system upon focusing on infinity according to Fifth Example. FIG. 10B shows various aberration graphs of the optical system upon focusing on a shortest-distance object (photographing magnification $\beta = -1.0$) according to Fifth Example. The various aberration graphs show that in the optical system according to Fifth Example, over the entire range from focusing on infinity to focusing on the shortest-distance object, the various aberrations are favorably corrected, and an excellent imaging performance is achieved.

Next, the table of [Conditional Expression Corresponding Value] is shown below. This table collectively indicates values corresponding to the conditional expressions (1) to (20) with respect to all Examples (First to Fifth Examples).

| | |
|---|---|
| $0.20 < DG4/TL < 0.40$ | Conditional Expression (1) |
| $3.00 < (LnR2+LnR1)/(LnR2-LnR1) < 5.00$ | Conditional Expression (2) |
| $0.75 < f1/(-f2) < 1.30$ | Conditional Expression (3) |
| $1.80 < ndM1$ | Conditional Expression (4) |
| $vdM1 < 26.00$ | Conditional Expression (5) |
| $\theta gFM1-(0.6415-0.00162 \times vdM1) < 0.0120$ | Conditional Expression (6) |
| $0.75 < f1/f3 < 1.20$ | Conditional Expression (7) |
| $0.45 < (-\beta)$ | Conditional Expression (8) |
| $35.0 < \beta2/\beta3 < 350.0$ | Conditional Expression (9) |
| $0.005 < \beta3/\beta2 < 0.035$ | Conditional Expression (10) |
| $\{\beta2+(1/\beta2)\}^{-2} < 0.10$ | Conditional Expression (11) |
| $\{\beta3+(1/\beta3)\}^{-2} < 0.10$ | Conditional Expression (12) |
| $0.05 < Bf/TL < 0.35$ | Conditional Expression (13) |
| $0.10 < Bf/f < 0.50$ | Conditional Expression (14) |

| | |
|---|---|
| $0.50 < L1S/SLn < 1.00$ | Conditional Expression (15) |
| $0.70 < Mf2/Mf3 < 1.10$ | Conditional Expression (16) |
| $1.80 < ndM3$ | Conditional Expression (17) |
| $vdM3 < 26.00$ | Conditional Expression (18) |
| $\theta gFM3-(0.6415-0.00162 \times vdM3) < 0.0120$ | Conditional Expression (19) |
| $(L1R2+L1R1)/(L1R2-L1R1) < 0.10$ | Conditional Expression (20) |

[Conditional Expression Corresponding Value]
(First to Third Examples)

| Conditional Expression | First Example | Second Example | Third Example |
|---|---|---|---|
| (1) | 0.294 | 0.295 | 0.263 |
| (2) | 3.537 | 4.159 | 4.272 |
| (3) | 1.142 | 1.152 | 1.176 |
| (4) | 1.855 | 1.855 | 1.855 |
| (5) | 25.15 | 25.15 | 25.15 |
| (6) | 0.0095 | 0.0095 | 0.0095 |
| (7) | 1.060 | 1.079 | 1.046 |
| (8) | 1.00 | 1.00 | 1.00 |
| (9) | 54.19 | 61.71 | 37.44 |
| (10) | 0.018 | 0.016 | 0.027 |
| (11) | 0.015 | 0.013 | 0.020 |
| (12) | 0.022 | 0.019 | 0.033 |
| (13) | 0.116 | 0.116 | 0.122 |
| (14) | 0.168 | 0.169 | 0.167 |
| (15) | 0.649 | 0.651 | 0.779 |
| (16) | 0.914 | 0.897 | 0.889 |
| (17) | 1.855 | 1.855 | 1.855 |
| (18) | 25.15 | 25.15 | 25.15 |
| (19) | 0.0095 | 0.0095 | 0.0095 |
| (20) | −0.798 | −1.381 | −0.109 |

[Conditional Expression Corresponding Value](Fourth to Fifth Examples)

| Conditional Expression | Fourth Example | Fifth Example |
|---|---|---|
| (1) | 0.311 | 0.302 |
| (2) | 3.250 | 3.869 |
| (3) | 1.115 | 1.132 |
| (4) | 1.855 | 1.855 |
| (5) | 25.15 | 25.15 |
| (6) | 0.0095 | 0.0095 |
| (7) | 1.042 | 1.090 |
| (8) | 1.00 | 1.00 |
| (9) | 72.20 | 42.96 |
| (10) | 0.014 | 0.023 |
| (11) | 0.011 | 0.019 |
| (12) | 0.016 | 0.027 |
| (13) | 0.100 | 0.115 |
| (14) | 0.158 | 0.170 |
| (15) | 0.613 | 0.679 |
| (16) | 0.845 | 0.947 |
| (17) | 1.855 | 1.855 |
| (18) | 25.15 | 25.15 |
| (19) | 0.0095 | 0.0095 |
| (20) | −0.200 | −0.050 |

According to Examples described above, the optical systems having small aberration fluctuation during focusing can be achieved.

Each of the aforementioned Examples describes a specific example of the invention of the present application. The invention of the present application is not limited to these examples.

The following content can be adopted in a range without impairing the optical performances of the optical systems according to this embodiment.

The four-group configurations are described as Examples of the optical systems according to this embodiment. However, the present application is not limited to these configurations. An optical system having another group configuration (e.g., a five-group one etc.) may be configured. Specifically, a configuration may be adopted where a lens or a lens group is added to a position closest to the object or a position closest to the image surface in the optical system in this embodiment. Note that the lens group indicates a portion that includes at least one lens separated by air distances that change during focusing.

A vibration-proof lens group that moves a lens group or a partial lens group so as to have a component in a direction perpendicular to the optical axis, or rotationally moves (swings) the lens group or the partial lens group in a direction in a plane including the optical axis, and corrects an image blur caused by camera shakes, may be configured.

The lens surface may be made up of a spherical surface or a planar surface, or an aspherical surface. A case where the lens surface is a spherical surface or a planar surface is preferable, because lens processing, and assembling and adjustment are facilitated, and the optical performance degradation due to errors caused by processing and assembling and adjustment can be prevented. It is also preferable because the degradation in representation performance be small even with a possible misaligned image surface.

In the cases where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

Preferably, the aperture stop is disposed between the second lens group and the third lens group. Alternatively, a member serving as an aperture stop is not necessarily provided, and a lens frame may play the role instead.

An antireflection film having a high transmissivity in a wide wavelength region may be applied onto each lens surface in order to reduce flares and ghosts and achieve optical performances having a high contrast.

| EXPLANATION OF NUMERALS AND CHARACTERS | | | |
|---|---|---|---|
| G1 | First lens group | G2 | Second lens group |
| G3 | Third lens group | G4 | Fourth lens group |
| I | Image surface | S | Aperture stop |

The invention claimed is:

1. An optical system comprising: in order from an object on an optical axis, a first lens group having a positive refractive power; a second lens group having a negative refractive power; a third lens group having a positive refractive power; and a fourth lens group having a negative refractive power, wherein, during focusing, the second lens group and the third lens group move on the optical axis and distances between the lens groups adjacent to each other change, and the following conditional expressions are satisfied, $$0.20 < DG4/TL < 0.40,$$

$$0.15 < Bf/f < 0.50,$$

$$(L1R2 + L1R1)/(L1R2 - L1R1) < 0.10,$$

where DG4: a length of the fourth lens group on the optical axis,

TL: an entire length of the optical system upon focusing on infinity,

Bf: a back focus of the optical system upon focusing on infinity, f: a focal length of the optical system, L1R1: a radius of curvature of an object-side lens surface of a positive lens disposed closest to the object in the optical system, and L1R2: a radius of curvature of an image-side lens surface of the positive lens disposed closest to the object in the optical system.

2. The optical system according to claim 1, wherein the following conditional expression is satisfied, $$0.75 < f1/f3 < 1.20,$$

where f1: a focal length of the first lens group, and f3: a focal length of the third lens group.

3. The optical system according to claim 1, wherein the following conditional expression is satisfied, $$0.45 < (-\beta),$$

where β: a lateral magnification of the optical system.

4. The optical system according to claim 1, wherein the following conditional expression is satisfied, $$35.0 < \beta2/\beta3 < 350.0,$$

where β2: a lateral magnification of the second lens group upon focusing on infinity, and β3: a lateral magnification of the third lens group upon focusing on infinity.

5. The optical system according to claim 1, wherein the following conditional expression is satisfied, $$0.005 < \beta3/\beta2 < 0.035,$$

where β2: a lateral magnification of the second lens group upon focusing on infinity, and β3: a lateral magnification of the third lens group upon focusing on infinity.

6. The optical system according to claim 1, wherein the following conditional expression is satisfied, $$\{\beta2 + (1/\beta2)\}^{-2} < 0.10,$$

where β2: a lateral magnification of the second lens group upon focusing on infinity.

7. The optical system according to claim 1, wherein the following conditional expression is satisfied, $$\{\beta + (1/\beta3)\}^{-2} < 0.10,$$

where β3: a lateral magnification of the third lens group upon focusing on infinity.

8. The optical system according to claim 1, wherein the following conditional expression is satisfied, $$0.05 < Bf/TL < 0.35,$$

where Bf: a back focus of the optical system upon focusing on infinity, and

TL: an entire length of the optical system upon focusing on infinity.

9. The optical system according to claim 1, further comprising an aperture stop, wherein the following conditional expression is satisfied, $$0.50 < L1S/SLn < 1.00,$$

where L1S: a distance on the optical axis from a most object-side lens surface of the optical system to the aperture stop upon focusing on infinity, and SLn: a distance on the optical axis from the aperture stop to a most image-side lens surface of the optical system upon focusing on infinity.

10. The optical system according to claim 1, wherein the following conditional expression is satisfied, $$0.70 < Mf2/Mf3 < 1.10,$$

where Mf2: an absolute value of an amount of movement of the second lens group during focusing from an infinity object to a shortest-distance object, and Mf3: an absolute value of an amount of movement of the third lens group during focusing from the infinity object to the shortest-distance object.

11. The optical system according to claim 1, wherein the third lens group includes a negative lens in which the following conditional expressions are satisfied, $$1.80 < ndM3,$$

$$vdM3 < 26.00,$$

$$\theta gFM3 - (0.6415 - 0.00162 \times vdM3) < 0.0120,$$

where ndM3: a refractive index of the negative lens of the third lens group for d-line, vdM3: an Abbe number of the negative lens of the third lens group, and θgFM3: a partial dispersion ratio of the negative lens of the third lens group, which is defined by the following expression, $$\theta gFM3 = (ngM3 - nFM3)/(nFM3 - nCM3),$$

where ngM3 is a refractive index of the negative lens of the third lens group for g-line, nFM3 is a refractive index of the negative lens of the third lens group for F-line, and nCM3 is a refractive index of the negative lens of the third lens group for C-line.

12. The optical system according to claim 1, wherein a lens disposed closest to an image in the fourth lens group has a negative refractive power.

13. The optical system according to claim 1, wherein, during focusing from an infinity object to a short-distance object, the second lens group moves toward an image on the optical axis, and the third lens group moves toward the object on the optical axis.

14. The optical system according to claim 1, wherein, during focusing, a position of the first lens group is fixed with respect to an image surface.

15. The optical system according to claim 1, wherein, during focusing, a position of the fourth lens group is fixed with respect to an image surface.

16. An optical apparatus comprising the optical system according to claim 1.

17. A method for manufacturing an optical system comprising: in order from an object on an optical axis, a first lens group having a positive refractive power; a second lens group having a negative refractive power; a third lens group having a positive refractive power; and a fourth lens group having a negative refractive power, the method comprising disposing the first to the fourth lens groups in a lens barrel such that, during focusing, the second lens group and the third lens group move on the optical axis and distances between the lens groups adjacent to each other change, the method further comprising one of features A or B, wherein the feature A comprises:

satisfying the following conditional expressions, $$0.20 < DG4/TL < 0.40,$$

$$0.15 < Bf/f < 0.50,$$

$$(L1R2 + L1R1)/(L1R2 - L1R1) < 0.10,$$

where DG4: a length of the fourth lens group on the optical axis,

TL: an entire length of the optical system upon focusing on infinity,

Bf: a back focus of the optical system upon focusing on infinity, f: a focal length of the optical system, L1R1: a radius of curvature of an object-side lens surface of a positive lens disposed closest to the object in the optical system, and L1R2: a radius of curvature of an image-side lens surface of the positive lens disposed closest to the object in the optical system, and the feature B comprises:

satisfying the following conditional expressions, $$0.20 < DG4/TL < 0.40,$$

$$0.60 < L1S/SLn < 1.00,$$

$$(L1R2 + L1R1)/(L1R2 - L1R1) < 0.10,$$

where DG4: a length of the fourth lens group on the optical axis,

TL: an entire length of the optical system upon focusing on infinity,

L1S: a distance on the optical axis from a most object-side lens surface of the optical system to the aperture stop upon focusing on infinity, SLn: a distance on the optical axis from the aperture stop to a most image-side lens surface of the optical system upon focusing on infinity, L1R1: a radius of curvature of an object-side lens surface of a positive lens disposed closest to the object in the optical system, and L1R2: a radius of curvature of an image-side lens surface of the positive lens disposed closest to the object in the optical system.

18. An optical system comprising: in order from an object on an optical axis, a first lens group having a positive refractive power; a second lens group having a negative refractive power; a third lens group having a positive refractive power; and a fourth lens group having a negative refractive power, wherein, during focusing, the second lens group and the third lens group move on the optical axis and distances between the lens groups adjacent to each other change, and the following conditional expressions are satisfied, $$0.20 < DG4/TL < 0.40,$$

$$0.60 < L1S/SLn < 1.00,$$

$$(L1R2 + L1R1)/(L1R2 - L1R1) < 0.10,$$

where DG4: a length of the fourth lens group on the optical axis,

TL: an entire length of the optical system upon focusing on infinity,

L1S: a distance on the optical axis from a most object-side lens surface of the optical system to the aperture stop upon focusing on infinity, SLn: a distance on the optical axis from the aperture stop to a most image-side lens surface of the optical system upon focusing on infinity, L1R1: a radius of curvature of an object-side lens surface of a positive lens disposed closest to the object in the optical system, and L1R2: a radius of curvature of an image-side lens surface of the positive lens disposed closest to the object in the optical system.

\* \* \* \* \*